US011522436B2

(12) United States Patent
Mitri

(10) Patent No.: US 11,522,436 B2
(45) Date of Patent: Dec. 6, 2022

(54) PERMANENTLY MAGNETIZED ENHANCED GENERATOR

(71) Applicant: Darrell Schmidt Enterprises, Inc., Brenham, TX (US)

(72) Inventor: George N. Mitri, Brenham, TX (US)

(73) Assignee: Darrell Schmidt Enterprises, Inc., Brenham, TX (US)

( * ) Notice: Subject to any disclaimer, the term of this patent is extended or adjusted under 35 U.S.C. 154(b) by 39 days.

(21) Appl. No.: 17/066,348

(22) Filed: Oct. 8, 2020

(65) Prior Publication Data

US 2021/0111618 A1   Apr. 15, 2021

Related U.S. Application Data

(60) Provisional application No. 62/915,472, filed on Oct. 15, 2019.

(51) Int. Cl.
*H02K 1/02* (2006.01)
*H02K 51/00* (2006.01)
*H02S 10/10* (2014.01)
*H02P 17/00* (2006.01)
*H02S 10/20* (2014.01)

(52) U.S. Cl.
CPC ............... *H02K 51/00* (2013.01); *H02K 1/02* (2013.01); *H02P 17/00* (2013.01); *H02S 10/10* (2014.12); *H02S 10/20* (2014.12)

(58) Field of Classification Search
CPC .................................. H02K 1/02; H02K 51/00
See application file for complete search history.

(56) References Cited

U.S. PATENT DOCUMENTS

| 2,768,316 | A | | 10/1956 | Neiss | |
|---|---|---|---|---|---|
| 2,778,960 | A | | 1/1957 | Anderson | |
| 3,221,172 | A | * | 11/1965 | Rolison | H02J 9/08 322/9 |
| 3,467,845 | A | * | 9/1969 | Wesolowski | H02K 19/24 310/198 |
| 3,670,189 | A | | 6/1972 | Monroe | |
| 4,114,057 | A | * | 9/1978 | Esters | H02K 23/04 310/46 |
| 4,517,477 | A | | 5/1985 | Pankratz | |
| 4,571,528 | A | | 2/1986 | McGee et al. | |

(Continued)

FOREIGN PATENT DOCUMENTS

| ES | 2585848 B1 | 4/2015 |
|---|---|---|
| ES | 2612787 B1 | 11/2015 |
| FR | 2463992 | 2/1981 |

*Primary Examiner* — Dang D Le

(74) *Attorney, Agent, or Firm* — Park, Vaughan, Fleming & Dowler LLP; Shane Nelson

(57) ABSTRACT

Apparatuses, systems, and methods of use for a generator is disclosed. In one embodiment, the generator has a stator and a rotor and a first plurality of magnets coupled to the rotor and a second plurality of magnets coupled to the stator. An external magnetic housing may be coupled to an input shaft of the generator or surround the generator itself. A first layer of magnets produce a rotating magnetic field and a second layer of magnets create a static magnetic field, whether such magnets are in the generator itself or within an external magnetic housing. The disclosed generator increases the mechanical power inputted into the generator, which then produces an increased output of the generator.

21 Claims, 9 Drawing Sheets

(56) References Cited

U.S. PATENT DOCUMENTS

| | | |
|---|---|---|
| 4,639,626 A | 1/1987 | McGee |
| 4,751,486 A | 6/1988 | Minato |
| 4,808,869 A | 2/1989 | Kopp |
| 4,996,457 A | 2/1991 | Hawsey et al. |
| 5,198,689 A | 3/1993 | Fujioka |
| 5,204,572 A | 4/1993 | Ferreira |
| 5,477,094 A | 12/1995 | Lamb |
| 5,594,289 A | 1/1997 | Minato |
| 5,596,238 A | 1/1997 | Milnikel |
| 5,604,390 A | 2/1997 | Ackermann |
| 5,696,419 A | 12/1997 | Rakestraw et al. |
| 5,712,519 A | 1/1998 | Lamb |
| 5,712,520 A | 1/1998 | Lamb |
| 5,780,944 A | 7/1998 | Sakamoto |
| 5,783,894 A | 7/1998 | Wither |
| 5,834,872 A | 11/1998 | Lamb |
| 5,902,185 A | 5/1999 | Kubiak et al. |
| 5,982,063 A | 11/1999 | Lutz et al. |
| 6,005,317 A | 12/1999 | Lamb |
| 6,025,667 A | 2/2000 | Narita et al. |
| 6,034,458 A | 3/2000 | Uetake et al. |
| 6,043,578 A | 3/2000 | Lamb |
| 6,072,258 A | 6/2000 | Lamb |
| 6,104,102 A | 8/2000 | Tsuji et al. |
| 6,169,343 B1 | 1/2001 | Rich, Sr. |
| 6,172,438 B1 | 1/2001 | Sakamoto |
| 6,242,832 B1 | 6/2001 | Lamb |
| 6,259,233 B1 | 7/2001 | Caamano |
| 6,265,801 B1 | 7/2001 | Hashiba et al. |
| 6,359,359 B1 | 3/2002 | Miura et al. |
| 6,373,162 B1 | 4/2002 | Liang et al. |
| 6,437,468 B2 | 8/2002 | Stahl et al. |
| 6,445,100 B2 | 9/2002 | Tajima et al. |
| 6,555,941 B1 | 4/2003 | Zepp et al. |
| 6,603,232 B2 | 8/2003 | Van Dine et al. |
| 6,682,430 B2 | 1/2004 | Killen |
| 6,700,288 B2 | 3/2004 | Smith |
| 6,703,741 B1 | 3/2004 | Ifrim |
| 6,703,746 B2 | 3/2004 | Biais et al. |
| 6,710,502 B2 | 3/2004 | Maslov et al. |
| 6,717,315 B1 | 4/2004 | Tajima et al. |
| 6,727,628 B2 | 4/2004 | Shimada et al. |
| 6,777,851 B2 | 8/2004 | Maslov |
| 6,794,784 B2 | 9/2004 | Takahashi et al. |
| 6,803,690 B2 | 10/2004 | Bosch |
| 6,891,306 B1 | 5/2005 | Soghomonian et al. |
| 6,940,199 B2 | 9/2005 | Imamura et al. |
| 6,946,766 B2 | 9/2005 | Gary et al. |
| 7,122,923 B2 | 10/2006 | Lafontaine et al. |
| 7,218,025 B1 | 5/2007 | McDonald |
| 7,227,330 B2 | 6/2007 | Swamy et al. |
| 7,268,454 B2 | 9/2007 | Wise |
| 7,294,947 B2 | 11/2007 | Corbin, III et al. |
| 7,385,332 B2 | 6/2008 | Himmelmann et al. |
| 7,400,069 B2 | 7/2008 | Kundel |
| 7,402,929 B1 | 7/2008 | Dilliner |
| 7,453,177 B2 | 11/2008 | Highfill et al. |
| 7,474,029 B2 | 1/2009 | Rahman et al. |
| 7,550,891 B2 | 6/2009 | Kim |
| 7,687,956 B2 | 3/2010 | Wise |
| 7,791,235 B2 | 9/2010 | Kern et al. |
| 7,816,830 B2 | 10/2010 | Dickes |
| 7,843,101 B2 | 11/2010 | Ito et al. |
| 7,847,535 B2 | 12/2010 | Meynard et al. |
| 7,876,014 B2 | 1/2011 | Lee |
| 3,030,817 A1 | 10/2011 | Sakai et al. |
| 8,049,388 B2 | 11/2011 | Kolehmainen |
| 8,049,586 B2 | 11/2011 | Feng |
| 8,097,993 B2 | 1/2012 | Finkle et al. |
| 8,330,316 B2 | 12/2012 | Petro et al. |
| 8,330,317 B2 | 12/2012 | Burch et al. |
| 8,334,667 B2 | 12/2012 | Sakai et al. |
| 8,400,748 B2 | 3/2013 | Yamamoto et al. |
| 8,461,737 B2 | 6/2013 | Feng et al. |
| 8,471,425 B2 | 6/2013 | Petro et al. |
| 8,487,484 B1 | 7/2013 | Miller, Jr. et al. |
| 8,550,196 B2 | 10/2013 | Ross |
| 8,598,836 B1 | 12/2013 | Rabinovich |
| 8,610,324 B2 | 12/2013 | Grann et al. |
| 8,772,994 B2 | 7/2014 | Feng et al. |
| 8,846,224 B2 | 9/2014 | Paulsen et al. |
| 8,987,939 B2 | 3/2015 | Yu et al. |
| 9,071,102 B2 | 6/2015 | Cavalier |
| 9,103,322 B2 | 8/2015 | Jeon |
| 9,112,395 B2 * | 8/2015 | Shim ............... H02K 11/02 |
| 9,331,532 B2 | 5/2016 | Zhang et al. |
| 9,692,266 B2 * | 6/2017 | Nehl ............... H02K 1/2766 |
| 9,735,631 B2 | 8/2017 | Kayano et al. |
| 9,855,069 B2 | 1/2018 | Jezierski |
| 9,871,431 B2 | 1/2018 | Miller |
| 9,906,116 B2 | 2/2018 | Knapp |
| 10,014,738 B2 * | 7/2018 | Tojima ............... H02K 49/06 |
| 10,523,026 B2 | 12/2019 | Matsushita |
| 2002/0132671 A1 | 9/2002 | Killen |
| 2002/0135242 A1 | 9/2002 | Kawai |
| 2002/0171309 A1 | 11/2002 | Wakui et al. |
| 2005/0140231 A1 | 6/2005 | Ogoshi |
| 2008/0203831 A1 | 8/2008 | French |
| 2008/0238232 A1 | 10/2008 | Bando |
| 2010/0213778 A1 | 8/2010 | Knutson |
| 2010/0308601 A1 | 12/2010 | Walden |
| 2011/0068746 A1 | 3/2011 | Rocci et al. |
| 2011/0089782 A1 | 4/2011 | Jeung |
| 2011/0095636 A1 | 4/2011 | Lee |
| 2011/0135972 A1 | 6/2011 | Paulsen et al. |
| 2012/0091731 A1 | 4/2012 | Nelson |
| 2012/0118100 A1 | 5/2012 | Mordukhovich et al. |
| 2013/0119763 A1 | 5/2013 | Zhu et al. |
| 2013/0119804 A1 | 5/2013 | French |
| 2013/0229059 A1 | 9/2013 | Baba et al. |
| 2013/0257208 A1 | 10/2013 | Samuels |
| 2014/0049128 A1 | 2/2014 | Zang |
| 2014/0167545 A1 | 6/2014 | Bremner et al. |
| 2014/0210483 A1 | 7/2014 | Uchida |
| 2014/0246960 A1 | 9/2014 | Smith |
| 2015/0035415 A1 | 2/2015 | Zang |
| 2015/0197163 A1 | 7/2015 | Loftus et al. |
| 2016/0036311 A1 | 2/2016 | Lee |
| 2017/0222536 A1 | 8/2017 | Chrivia |

\* cited by examiner

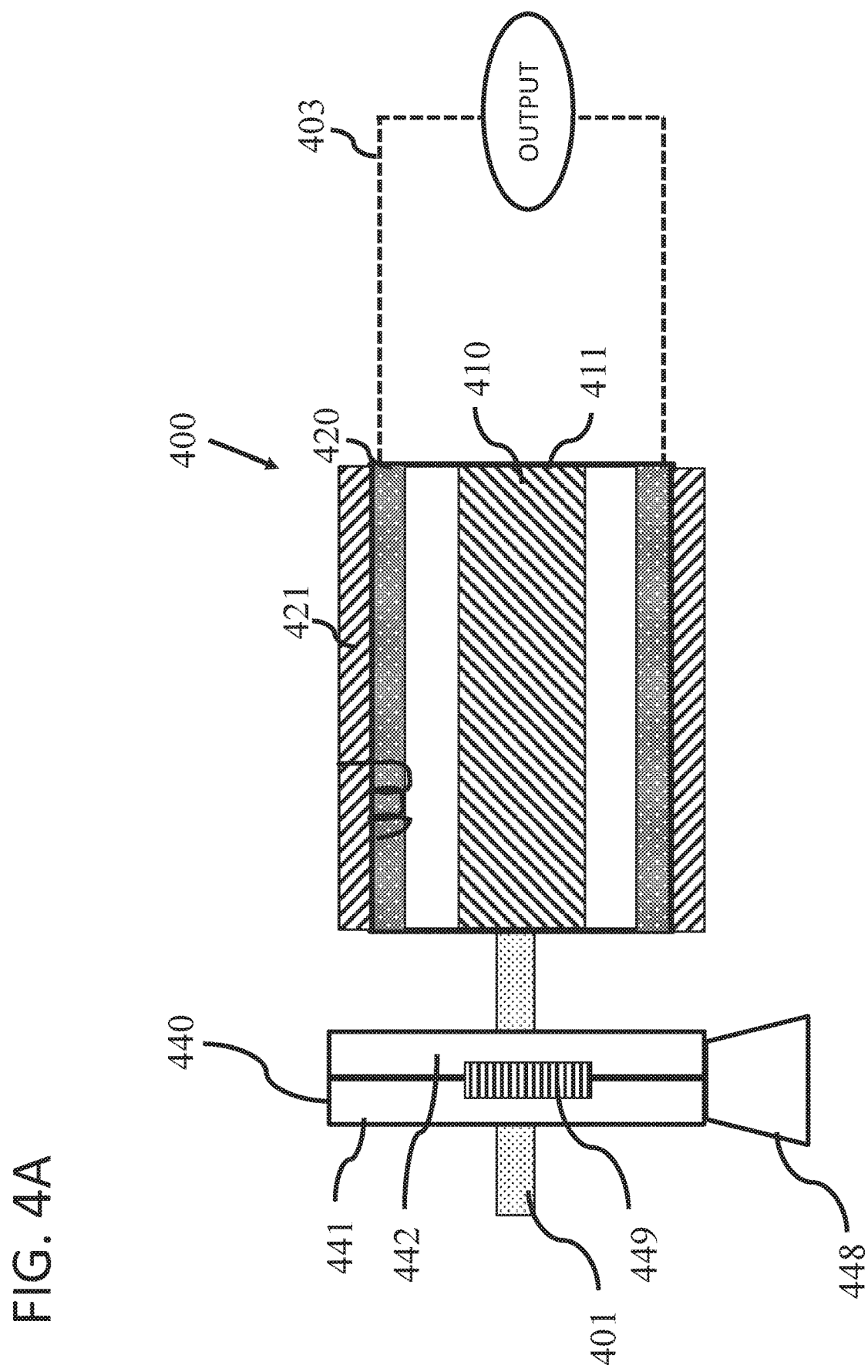

PERMANENTLY MAGNETIZED ENHANCED GENERATOR

This application claims priority to U.S. provisional patent application No. 62/915,472, filed on Oct. 15, 2019, the entire content of which is incorporated herein by reference.

BACKGROUND OF THE INVENTION

Field of the Invention

This invention relates to generators (or alternators), and more particularly to a generator that utilizes permanent magnets to create a permanent magnetic field.

Description of the Related Art

Motors, alternators, and generators are well known in the art. For the purposes of this disclosure, a motor is a conventional electric motor with an output shaft and an alternator is a conventional alternator with an input shaft. As is known in the art, a motor is an electrical device that converts electrical energy into mechanical energy, and generally reverse to a motor, an alternator (or generator) is an electrical device that converts mechanical energy into electrical energy.

As is known in the art, an alternator or generator may have a rotor and a stator. The rotor is the moving part of the alternator that generally turns the shaft of the alternator from the inputted mechanical power. The stator is the stationary part of the alternator and usually consists of coiled windings. Rotation of the rotor induces a magnetic field in the coiled windings that creates electrical energy in the stator. One such alternator is disclosed in U.S. Pat. No. 9,768,632 (the "'632 Patent"), incorporated herein by reference. Looking at FIG. 1 of the '632 Patent, an electric motor 125 engages and rotates an alternator 130, and in particular an output shaft of the electric motor is coupled to an input shaft of the alternator by mechanical coupling 127. A generator can be AC based, which is called an alternator, or it may be DC based, which is called a DC generator or dynamo. The alternator may or may not have an exciting coil. A permanent magnetic generator (PMG) is a generator where the excitation field is provided by permanent magnets on the rotor instead of an exciting coil adjacent the rotor. While a typical PMG generator may have ferrous permanent magnets coupled to a rotor, it does not have an outer set of permanent magnets as part of the stator, and it does not utilize neodymium magnets.

Alternators may be used in a variety of applications, such as in substantially standalone operations or as part of electric power stations such as those disclosed in the '632 Patent. However, existing alternators/generators are inefficient and create differing levels of energy loss depending on the configuration of the alternator/generator and related system and particular application/operation.

An improved generator is needed to efficiently transfer mechanical energy into electrical energy. An improved generator is needed that can increase, magnify, and/or otherwise enhance the supplied energy/power from the generator. An improved generator is needed that is more efficient, can run at slower speeds, and provides for increased torque.

SUMMARY

Apparatuses, systems, and methods of use for a generator is disclosed. In one embodiment, the generator comprises a stator and a rotor and a first plurality of magnets coupled to the rotor and a second plurality of magnets coupled to the stator. An external magnetic housing may be coupled to an input shaft of the generator or surround the generator itself. A first layer of magnets produce a rotating magnetic field and a second layer of magnets create a static magnetic field, whether such magnets are in the generator itself or within an external magnetic housing. The disclosed generator increases the mechanical power inputted into the generator, which then produces an increased output of the generator.

Disclosed is a generator that comprises a rotor and a stator and first plurality of permanent magnets coupled to the rotor and a second plurality of permanent magnets coupled to the stator. The generator may be an alternator or a DC generator. The first plurality of permanent magnets is configured to rotate with the rotor and the second plurality of permanent magnets is configured to remain stationary. The first plurality of permanent magnets is positioned at a first radial position and the second plurality of permanent magnets is positioned at a second radial position. The first and/or second plurality of permanent magnets may comprise a plurality of different magnet strengths. Each of the first plurality of magnets may be positioned adjacent to a magnet of a different strength. Each of the first plurality of permanent magnets and the second plurality of magnets comprises neodymium magnets. The second plurality of permanent magnets is configured to increase the magnetic flux from the generator and the mechanical rotation of the rotor.

The generator may further include an input shaft coupled to the rotor and a magnetic housing surrounding at least a portion of the input shaft, wherein the magnetic housing comprises a third plurality of permanent magnets and a fourth plurality of magnets. The magnetic housing may comprise a plurality of radial disks, wherein the third plurality of permanent magnets is located within the plurality of radial disks. The magnetic housing may comprise a ring positioned between the plurality of radial disks, wherein the fourth plurality of permanent magnets is coupled to the ring. The third plurality of permanent magnets may be located at a first radial position and the fourth plurality of permanent magnets may be located at a second radial position. The third plurality of permanent magnets may be coupled to the input shaft and configured to rotate with the input shaft, wherein the fourth plurality of permanent magnets may be configured to remain substantially stationary. The third and fourth plurality of permanent magnets is configured to increase the magnetic flux from the generator.

Also is disclosed a permanent magnetized generator that comprises a rotor and a stator, wherein the stator comprises a plurality of permanent magnets, wherein the plurality of permanent magnets is configured to increase the magnetic flux of the generator. The power output from the generator may be increased by at least two times based upon the plurality of permanent magnets.

Also is disclosed a permanent magnetized generator that comprises a rotor and a stator and a magnetic housing external to the stator and configured to increase the magnetic flux of the generator. The magnetic housing at least partially surrounds the stator, wherein the magnetic housing comprises a plurality of permanent magnets. The generator may further comprise an input shaft coupled to the rotor, wherein the magnetic housing at least partially surrounds the input shaft, wherein the magnetic housing comprises a first plurality of permanent magnets at a first radial position and a second plurality of permanent magnets at a second radial position.

Also disclosed is a magnetic electrical power storage and production system that comprises an electric motor and an electrical energy generator coupled to the electric motor, wherein the electrical energy generator comprises a rotor and a stator and a first plurality of permanent magnets coupled to the stator. The first plurality of permanent magnets remain stationary as the rotor rotates. The generator may further comprise a second plurality of permanent magnets coupled to the rotor and configured to rotate with the rotor. An output power from the generator is greater than at least two times an input power to the motor.

Also disclosed is a method of operating a generator, comprising providing a generator with a rotor and a stator and a plurality of permanent magnets coupled to the stator, increasing a static magnetic field of the generator by the plurality of permanent magnets, and rotating the rotor by a prime mover coupled to the generator to produce electrical output from the generator. The method may further comprise coupling a magnetic housing external to the generator to increase a magnetic flux of the generator. The method may further comprise rotating a second plurality of permanent magnets coupled to the rotor to increase the magnetic flux of the generator.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 4A illustrates a schematic of one embodiment of a generator with an external magnetic housing according to the present disclosure.

DETAILED DESCRIPTION

Figure 1:
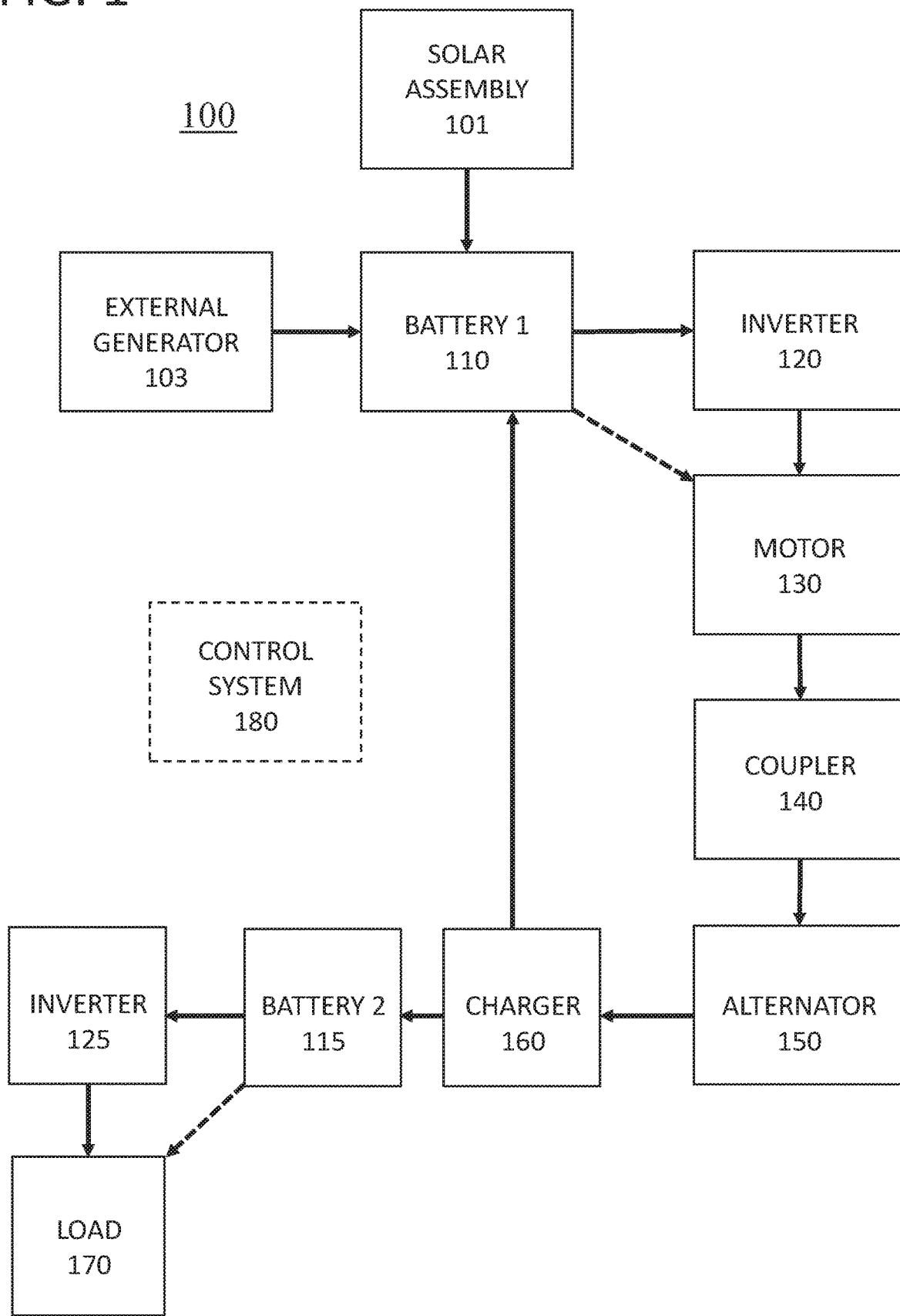
FIG. 1 illustrates an electrical flow diagram of one embodiment of an electrical power station of the present disclosure.

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Electric Power Station

In general, the disclosed electric power station ("EPS") uses one or more magnetic components as an integral part to the overall power production and/or distribution system. In one embodiment, the disclosed magnetic EPS may be similar to the EPS as described in U.S. Pat. No. 9,768,632 ("the '632 Patent"), incorporated herein by reference, but utilizes one or more magnetic devices and/or components as an integral part to the EPS, which are not disclosed in the '632 Patent. In one embodiment, any one or more of the components of the disclosed magnetic EPS (such as charging system, control system, power management system, etc.)

may be substantially similar to the similarly described components in the '632 Patent.

In general, the present application discloses a highly efficient regenerative hybrid power storage, generation, and management system. In one embodiment, it uses a combination of solar arrays and stored chemical potential energy (e.g., batteries) to drive one or more motors and/or electric alternators/generators. The system is a stand-alone system and may be scaled for industrial, commercial, or residential use. In one embodiment, a core concept of the EPS includes converting stored chemical energy to electrical energy, along with providing a method for storing, regenerating, and distributing this energy more efficiently, such as by using one or more magnetic devices as an integral component of the EPS. In one embodiment, the use and operation of the magnetic devices enhances the power, torque, efficiency, and/or other desired attributes/features of the EPS.

In one embodiment, electricity generated by the disclosed EPS may be utilized to directly service one or more electric loads, be transferred to the grid, and/or used to recharge the battery storage system of the EPS as needed. In one embodiment, the disclosed EPS is configured to power a wide range of devices that require electrical energy by using various mechanical and electrical principles of operation. In one embodiment, the disclosed EPS provides a regenerative energy storage and conversion apparatus and method to produce, store, and distribute electrical energy. In one embodiment, the disclosed EPS uses chemical energy to produce mechanical rotation and mechanical rotation to produce electrical energy. In one embodiment, the disclosed EPS generates and stores electrical energy as chemical potential energy in a plurality of batteries, to be transferred into mechanical energy on demand for the purpose of rotating an electrical generator to service a load and recharge the battery, and a method of production and distribution of the energy produced therefrom. In one embodiment, the disclosed EPS utilizes programmed computer control to monitor battery charge and direct energy flow for load servicing and distribution, including a regenerative system that senses or analyzes the need for energy to supply a load.

In one embodiment, the disclosed hybrid EPS both stores potential energy in batteries and generates electricity based upon demand. The load/demand may be consistently evaluated and distributed in real time by a system computer and controls. Thus, the EPS provides an energy source that may be utilized even when no electricity is available to recharge the batteries. For example, a solar cell array may be utilized as one source to charge the batteries, but solar cells only produce electrical energy when there is sufficient sunlight. Thus, the energy generated by the EPS may be engaged when sunlight is deficient or not available. In one embodiment, a backup power source (such as electricity from the grid, a solar array, a fuel fired generator, or other conventional means) may be employed as a backup system to maintain the charge of the batteries in the event that additional power is necessary that is not supplied by the solar array system. However, in a stand-alone or solitary configuration, the backup system could be limited to a solar array as one source providing independence from the electrical distribution grid.

In one embodiment, the disclosed EPS provides an environmentally sensitive electrical power station that may be scaled to service a plurality of loads, including but not limited to industrial, commercial or residential electrical demand with the ability to grow with increased electrical demands of the business or residence with minimal or no outside power source. The EPS uses electrical current (AC or DC) from a supply battery to power an electric motor (AC or DC) that in turn engages an alternator (AC or DC) to produce electrical power distributed to a plurality of load batteries to service a load (AC or DC) and use a portion of that generated electricity to recharge the supply batteries, and a method of production and distribution of the energy produced there from.

FIG. 1 illustrates one embodiment of an electric power station that may be used with a magnetic device/component. In one embodiment, this configuration is AC or DC based. In general, the EPS converts stored chemical energy (such as from a battery) into mechanical motive energy to cause rotation of an alternator to produce electricity. The disclosed EPS may comprise first battery bank 110, first inverter 120, second inverter 125, motor 130, coupler 140, alternator 150, charger 160, and second battery bank 115. Further, the EPS may comprise or be coupled to load 170. In some embodiments, solar assembly 101 may be coupled to a portion of the system, such as first battery bank 110. In some embodiments, external generator 103 is an external power supply source and may be used as a backup power source to the system and be coupled to a portion of the system, such as first battery bank 110, which may be useful if the solar array system is down or if there are long periods without power supplied from the solar array or during initial charging of the first battery system 110. The EPS may also comprise control system 180, which is electrically coupled to some or all of the components of the EPS. The control system may include a plurality of sensors, program logic controllers (PLC), one or more displays, and various other electrical components as is known in the art, and as more fully described in the '632 Patent, incorporated herein by reference. For example, if pneumatic or hydraulic fluids is used as part of the EPS, the control system may include various sensors, control loops, and actuators necessary for these extra components/features.

As described in more detail, any one or more of these components may be coupled with a magnet, magnetic device, and/or magnetic system to enhance one or more desired attributes of the EPS. For example, any one of the motor, coupler, and/or alternator (or generator) may be a magnetically enhanced device as described herein. In some embodiments, the motor, coupler, and/or alternator (or generator) may be coupled to a magnetic apparatus for enhancing various operations. As is known in the art, the EPS may be AC or DC based, a dynamo may be substituted for the alternator, and the EPS may or may not use an inverter. More or less components may be used based on the particular arrangements of the system. In one embodiment, the overall size and configuration of the system is designed for a particular load and particular application.

In one embodiment, solar assembly 101 provides power to EPS 100. The solar assembly may be an off the shelf unit appropriately sized for the EPS unit. The solar assembly may include one or more solar panels (e.g., a solar array), one or more combiner panels, and one or more charge controllers, as well as other solar assembly components as is known in the art. In one embodiment, the solar array is separate from the EPS and merely provides power to the EPS, while in other embodiments the solar array is considered an integral component of the EPS. In one embodiment, the solar array provides sufficient electrical energy to the battery systems of the EPS to maintain sufficient energy storage in the batteries to optimize functioning of the electricity production circuit(s) within the EPS. In other words, the solar array is able to charge the battery system to a minimum level to keep the EPS operating at a given power output. Solar array 101 may be any conventional solar panel system and/or array (along with an inverter and any necessary circuitry as is known in the art). Solar array 101 converts sunlight to electrical energy by the use of one or more solar cells. In use, the electricity generated from the solar cells maintains sufficient electrical charge in the batteries to energize the electric energy transfer and electricity production circuit within the EPS to produce electricity for distribution. While EPS 100 may run for short or long periods of time without recharge by the solar array system, at some point if the solar array does not generate sufficient electricity (such as due to weather conditions), another means of generating sufficient electricity may be needed to maintain the charge in the battery systems to energize the electric motor. In one embodiment, a gas or liquid fueled electricity generator 103 (which is known in the art), or even electrical energy from the grid, may be utilized to maintain the electric system energy input of the EPS at required levels and/or to recharge the battery system.

In one embodiment, EPS 100 comprises first battery system 110 and second battery system 115. In one embodiment, first battery system 110 is configured to supply electrical energy to the motor (and inverter if appropriate) and is a control battery system for the EPS, while second battery system 115 is configured to supply electrical energy to one or more loads (and inverter if appropriate). In one embodiment, first battery system 110 functions as and may be referred to as the source or power batteries, and second battery system 115 functions as and may be referred to as the load batteries. The source or power batteries are the power source for the prime mover (the motor) of the EPS. In other embodiments, only a single battery system is used. For example, a battery system may be used to power the EPS while the alternator directly powers one or more loads. Each battery system may comprise a plurality of batteries connected in series or in parallel and may be considered as a group or "bank" of batteries. The number of individual batteries in each battery bank is dependent upon the load the system is designed to service, and a particular battery unit output is designed for the specific load requirements of the EPS. In one embodiment, each battery within a battery bank or battery system is charged to capacity in unison until all of the battery units are optimally charged. In one embodiment, a first battery bank system is charged at a first charging rate while a second battery bank system is charged at a second charging rate. In other embodiments, a first battery bank system is charged while a second battery bank is discharged. Such battery systems increase the electrical energy storage capacity of the EPS by chemical energy storage, thereby enabling any unused electrical energy as potential energy in reserve. The battery systems are coupled to a control system of the EPS and/or a battery management system.

In one embodiment, the batteries may be any type of rechargeable batteries such as lead-acid, nickel-cadmium (NiCd), nickel-zinc (NiZn), nickel metal hydride (Ninth), lithium-ion (Li-ion), and others, and may have wet cell or dry cell batteries. In general, the disclosed EPS and present embodiments are not limited by any particular type of battery system, and may be any off the shelf rechargeable battery. In other embodiments, the battery system may utilize supercapacitors instead of a traditional rechargeable battery. As is known in the art, supercapacitors, such as supercaps or ultracaps, are high-capacity capacitors with a capacitance value much higher than traditional batteries, can accept and deliver charge much faster than batteries, and can handle many more charging/discharging cycles than rechargeable batteries. In comparison to a traditional battery, supercapacitors charge and discharge quicker and can provide more power.

In one embodiment, two separate battery systems may be desired for the power supply and load, as they will see different charging and discharging rates and it is generally desirable to keep the battery systems separate for better power management and control of the EPS. For example, as soon as a battery is charged/discharged, there is an increase in heat for the battery system; separating different battery systems for the different charging/discharging or power supply/load requirements helps manage heat for the EPS and batteries themselves. A separate battery system also allows a charging rate of one battery system at a greater rate than a discharging rate of the other battery system, as more fully described herein and in the '632 Patent. Another benefit of separating the power supplies is related to battery management. In one embodiment, the power batteries have a threshold charge under which the EPS system will shut down or start disconnecting loads. For example, normal operating ranges for the power supply may be in the order of 90-100%. If the charge of the power batteries is less than 90%, the EPS system is configured (via a control system) to reduce the discharge rate from the power supplies. This is important because in one embodiment, if the supply batteries fall below a predetermined threshold, under normal operations of power output and power input (from the solar array) the battery system can never fully recharge and there may be a slow downward cycle for the supply batteries. Eventually, once the supply batteries are down/fully discharged, the EPS system is down and cannot operate until the supply batteries are charged to a sufficient power level. On the other hand, the load batteries can be depleted more than the supply batteries. If the load batteries are down (or fall below any predetermined thresholds), the EPS can still function normally as long as the supply batteries are sufficiently charged. In one embodiment, the load batteries can drop down to 75%, 50%, or even 25% or less and the EPS unit can still work properly and still service the loads. Of course, depending on the connected loads, the power draws and duration of those loads, the EPS is designed to shut the power down to any one or more connected loads to maintain power in the load batteries or the supply batteries.

In one embodiment, supply battery system 110 is a different type of battery system than load battery system 115. In one embodiment, the source/supply batteries are slowly charged from the solar array, slowly discharged to the motor, and slowly charged from the EPS unit; in contrast, the load batteries may be quickly charged or discharged depending on the loads and the power provided from the EPS. In other words, the charging and discharging rates and capacities from the supply batteries and load batteries are different, and in one embodiment, the batteries are selected and/or configured based on these different charging capabilities. In one embodiment, the load battery is a battery configured for high charging and discharging rates, and the source/power batteries are configured for slow charging and discharging rates. In one embodiment, the load batteries may be a non-traditional battery source, such as a supercapacitor, which allows bursts of energy as needed for high load requirements.

In one embodiment, first battery system 110 is electrically coupled to an electrical conversion apparatus 120, such as an inverter, that converts DC current from the batteries to AC current for AC motor 130. In other embodiments, such as when the motor is a DC motor, an inverter may not be necessary, and power is routed directly from supply battery 110 to DC motor 130. An inverter is well known in the art, and generally is an electronic device that changes direct current (DC) to alternating current (AC), or vice versa. The input voltage, output voltage, and frequency, as well as overall power handling capabilities, depend in part on the inverter. The power inverter may be entirely electronic or may be a combination of mechanical effects (such as a rotary apparatus) and electronic circuitry. In general, there are two types of inverters—high output low frequency (HOLF) inverters and low output high frequency (LOHF) inverters. Both types are capable of operating at different frequencies, such as 50 and 60 Hz frequencies. Inverters may convert energy from DC to AC or AC to DC, and may convert the electrical energy to a wide range of frequencies. In one embodiment, inverter 120 converts 360 volt DC to three-phrase 380 volt AC. In other embodiments, the inverter converts 200 to 450 volt DC to three phase AC. In one embodiment, the inverter is a 3 phase inverter, may use a modified wave form, and/or may be a variable frequency drive (VFD) inverter that controls AC motor speed and torque by varying the motor input frequency and voltage.

Inverter 120 may be electrically coupled to motor 130, which may be coupled to alternator 150 by coupler 140. In one embodiment, motor 130 is a conventional electric motor with an output shaft, and alternator 150 is a conventional alternator with an input shaft. As is known in the art, a motor is an electrical device that converts electrical energy into mechanical energy, and generally reverse to a motor, a generator (such as an alternator or DC generator/dynamo) is an electrical device that converts mechanical energy into electrical energy. Coupler 140 may be a mechanical coupling (such as a spider coupling) that transfers the mechanical energy from the motor to the alternator. The mechanical coupling may be a conventional coupling as is known in the art or a high efficiency, high strength, light weight alloy or polymer based coupling system. In other embodiments, any one of the motor, coupler, or alternator may comprise or be coupled to a permanent magnetic device or system, as detailed further herein. As is known in the art, the motor and alternator are sized/configured to produce a certain amount or torque, power, or RPM. The motor and alternator are sized appropriately based on the load requirements of the EPS and the intended use/application. In one embodiment, the coupler is an assisting component of the EPS, and is used in the transfer of rotation/torque between the motor to the alternator. In one embodiment, each of the motor, inverter, and alternator is 3 phase, which is configured to produce 3 phase AC by the EPS, while in other embodiments the system is configured to produce single phase AC power. In one embodiment, the motor is the "prime mover" of the EPS system and not the "alternator" or the "coupler," while in other embodiments the collection of the motor, coupler, and alternator may be considered as the "prime mover" for the EPS. Inverter 125 may be substantially similar to inverter 120. Inverter 125 is illustrated in FIG. 1 as connecting battery system 115 to load 170, which assumes that load 170 is an AC based load. In the event that load 170 is a DC based load, inverter 125 may not be needed and power may flow directly from battery system 115 to load 170.

In one embodiment, motor 130 is an electric motor or device that converts electrical energy into mechanical energy. Motor 130 may be a DC motor or an AC motor. As is known in the art, a DC motor may receive power from a DC battery source without an inverter, while an AC motor requires an inverter to utilize power from a DC battery source. In one embodiment, the motor is a 3 phase asynchronous induction motor, while in other embodiments it is a brushless DC motor. Electric motor 130 may produce linear force or rotary force. In one embodiment, the electric motor uses a magnetic field and winding currents to generate force. As is known in the art, the electric motor may have a rotor and a stator. The rotor is the moving part of the motor that generally turns the shaft of the motor to produce mechanical power. The rotor may have permanent magnets or have conductors/windings that carry current. The stator is the stationary part of the motor and usually consists of either coiled windings or permanent magnets. The motor may be synchronous or asynchronous, and DC or AC based. If the motor is a brushless DC motor, then no inverter is necessary between the battery system and the motor. In one embodiment, the motor is sized based on the size of the EPS system, and in particular the targeted output horsepower, torque, or load of the EPS. In one embodiment, a brushed DC motor has an average efficiency value between 70-85%.

In one embodiment, the alternator is an electrical generator that converts mechanical energy to electrical energy in the form of alternating current. A generator, for the purposes of this disclosure, may include an alternator (which produces AC power) or a DC generator/dynamo (which produces DC power). Thus, while one may loosely consider the described alternator as a generator (which is generally known as a device that converts motive power into electrical power for use in an external circuit), the overall EPS system itself should more properly be considered as a generator (which includes both a motor and an alternator/generator). Conventional alternators have a rotor and a stator, and a rotating magnetic field in the rotor causes an induced AC voltage in the stator windings. In general, there are two primary ways to produce a magnetic field in an alternator. First, permanent magnets may be used which create their own persistent magnetic fields—these types of alternators may be called magnetos. Second, wound electric coils may be used to form an electromagnet to produce the rotating magnetic field. In some embodiments, a dynamo (DC based) is used instead of an alternator (AC based); as is known in the art, a DC based alternator is generally known as a dynamo, and an AC based alternator is simply an alternator. The benefits of the disclosed EPS does not depend on whether an alternator is DC based or AC based, or whether an alternator is used instead of a dynamo (which is generally considered to be an "alternator" as described herein). In one embodiment, the alternator is a 3 phase alternator, and may be a 3 phase permanent magnet alternator or generator (PMG/PMA).

Alternator 150 may be electrically coupled to charger/charging system 160 and/or load 170. Charger 160 is electrically coupled to one or more of the battery banks. For example, FIG. 1 illustrates charger 160 being electrically coupled to first battery system 110 and second battery system 115. EPS 100 is configured to not only charge the battery systems but to also provide electric energy to one or more loads. In some embodiments, the batteries are charged without supplying electrical energy to the loads, while in other embodiments electrical energy is provided to the load without electrical energy being provided to the batteries. In another embodiment, first battery system 110 is being charged while second battery system 115 is being discharged, while in another embodiment first battery system 110 is being charged while second battery system 115 is not being charged or discharged. In some embodiments, as more fully described in U.S. Pat. No. 9,768,632, incorporated herein by reference, the charger is configured to generate a rate of charge to one battery bank faster (such as battery bank 110) than a rate of discharge of another battery bank (such as battery 115).

Load 170 may comprise one or more internal or external loads. The load may be internal or external to the EPS. The load may be part of the EPS (such as a charger or other internal load) or merely coupled to the EPS. In one embodiment, a load of the EPS may be considered the charging system. In most applications, the load is an external load, such as any industrial, commercial, or residential load. In one embodiment, the electrical energy produced by the EPS may be distributed to load 170 for temporary or sustained usage via load battery system 115 to inverter 125 (if load is AC based) then to load 170. In one embodiment the EPS can functional normally and/or in normal operation without having a load connected. In other embodiments, the EPS can selectively turn on and off different loads that are connected to the EPS to maintain the desired battery levels of the system and other operating parameters, such as output power, voltage, or frequency. In one embodiment the EPS may operate in an energy conserving status or a battery recharging status such that the supply battery system 110 is recharged by directing most of the power produced from alternator 150 to battery system 110.

Control system 180 is electrically coupled to one or more of the components within EPS 100. The charging system of EPS 100 (as well as other components within EPS 100) is controlled by control system 180. In one embodiment, portions of control system 180 are electrically coupled to each of the components within EPS 100, and is used to regulate the production, management, and distribution of electrical energy within the EPS and to one or more of the connected loads. In one embodiment, the control system comprises one or more control units, sensors, and a plurality of inputs and outputs electrically connected to each of the EPS electronic components. In one embodiment, the control system manages the battery power within the EPS by controlling the charging and discharging of the battery banks via electronic instruction by using a series of mechanical and electronic devices to analyze, optimize, and perform power production, load servicing, and charging functions in sequence to achieve the particular goals/attributes of the EPS. In one embodiment, the control system manages the charge of battery system 110 (the supply battery system) by controlling the output power provided by the EPS and/or the loads serviced by the EPS. In one embodiment, the control system manages the input current/power provided by battery system 110 to motor 130 to achieve the desired output power provided by alternator 150.

As is known in the art, the control system may comprise one or more programmable logic controllers (PLCs). In general, a PLC is a known control device used in industrial control applications that employs the necessary hardware architecture of a computer and a relay ladder diagram language. It may be a programmable microprocessor-based device that is generally used in manufacturing to control assembly lines and machinery as well as many other types of mechanical, electrical, and electronic equipment. PLCs may be programmed in a variety of computer languages, and in one embodiment may be programmed in an IEC 61131 language. The PLCs and other components of the control system have been programmed by methods known in the art to enable individual control of each of the components in the EPS during normal operation.

The control system may further comprise programmed instruction with computerized control by known methods, including but not limited to a programmed logic controller (PLC), a personal computer, or commands transmitted through a network interface. Any control units of the control system may monitor the EPS system parameters such as voltage, current, temperature, rotational speed, vibration, frequency battery charge, load demand, alternator output, motor output, electrical energy inputs and outputs, etc., by receiving data from a plurality of sensors including but not limited to temperature sensors, current sensors, electricity demand sensors, and electrical charge-discharge sensors. The control system is configured to interpret or analyze the data according to programmed instructions/protocols and output necessary commands. In one embodiment, any received data input is processed in a control unit of the control system according to programming or command instructions, and instructions will be electronically output to a plurality of electrical switches and electrical valves within the control system and EPS to maintain system electricity generation and energy storage as required.

In one embodiment, when the control system signals a release of electrical energy, the electrical energy flows through an electrical supply line to a PLC/PC logic controller according to system electric demand. An electrical controller directs current flow through one or more of a plurality of electrically connected electrical control lines, which may be connected to motor 130. Electrical energy passing through an electric rotary motor 130 will cause the motor to rotate its output shaft which is in turn connected to a coupling 140 which is in turn connected to the input shaft of a specific alternator 150 designed to output a specific amount of electrical current. The alternator 150 may also be electrically connected (via charger 160) to specific battery storage units 110, 115. In one embodiment, current outflow from alternator 150 is directed into respective return electrical lines electrically connected to battery banks 110, 115 to complete the electrical circuit and return the electrical current back to the battery bank(s) for reuse. Thus, the control system is configured to monitor and control the battery systems and output from the alternator for optimal power distribution and battery recharging. This control feature permits disengagement of alternator 150 or diversion of the alternator output to assist in charging a battery unit.

In operation, electric motor 130 withdraws power from battery system 110 (which may or may not be regulated by inverter 120), which causes an output shaft of electric motor 130 to rotate. Thus, electrical energy is converted to mechanical energy. An input shaft of the coupled alternator 150 is rotated by direct mechanical connection to the output shaft of the motor via coupler 140. The alternator is energized to generate a specific output of electrical energy based on the design requirements and intended use/application of the EPS. Thus, mechanical energy is converted to electrical energy. The electrical energy produced by rotation of alternator 150 is directed to charging system 160. Thus, the mechanical energy from electric motor 130 is transferred to the electrical energy generator (alternator 150) to produce electrical energy for distribution and use by the EPS.

In one embodiment, the disclosed EPS may be scaled to fit large or small load demands. In one embodiment, the motor is similarly sized to the alternator. For larger load demands, a plurality of permanent magnet couplers may be utilized in series (which create an enhanced power amplification factor for the particular EPS), or a plurality of EPS systems may be combined to service a single load.

Magnetic Electric Power Station (MEPS)

The disclosed EPS utilizes specific components with permanent magnets that provide for increased torque, decreased power usage, and/or amplified power output to further increase the outputted power or torque based on the same amount of input, or similarly, to produce the same amount of power or torque based on a decreased power input. In one embodiment, the use of one or more magnetically enhanced devices significantly increases various benefits of the MEPS, including the ability to produce increased torque and/or increased RPM at the same electrical input, the ability to operate the motor and/or alternator at higher rates/RPMs based on the same or less electrical input, and/or the ability to generate a certain amount of power based on less input energy. In one embodiment, these added benefits overcome any negative side effects such as heat loss, device inefficiencies, etc. based on the increased number of system components.

In one embodiment, the combination of a motor and alternator/generator may be referred to loosely as a "genset," otherwise known as an engine/generator. As is known in the art, a "genset" generically refers to a set of separate devices or equipment that is combined together into a single "device" that is used to convert mechanical energy into electrical energy. For example, a conventional engine-generator or portable generator is the combination of an electrical generator and an engine (prime mover) mounted together to form a single piece of equipment; this combination is also called an engine-generator set or a gen-set. For the purposes of this disclosure, a genset includes a motor and an alternator/generator, and may include (but does not necessarily include) a coupling device between the motor and the alternator/generator.

In one embodiment, the use of specially arranged permanent magnets in each of the motor, coupler, and/or generator increases the magnetic field over each of the devices and varies different attributes of the torque, rotation, etc. of the EPS. While electricity may be provided to the particular magnetically enhanced device (e.g., an active magnetic device), in some embodiments the magnetic device may simply comprise a plurality of magnets without requiring additional energy (e.g., a passive magnetic device).

For the purposes of this disclosure, a magnetically enhanced device is a novel device and is not merely a device that utilizes a magnetic field as conventionally performed in the prior art. As is known in the art, conventional motors and alternators typically use some type of magnetic field for their normal operation. A typical motor may have a rotor and a stator with one or more electric coils in the stator to create an induced magnetic field in the rotor; however, a conventional motor does not utilize permanent magnets within the rotor. Likewise, a typical alternator may have a rotor with magnets that create an induced magnetic field in the stator; however, a conventional alternator does not utilize permanent magnets within the stator. In one embodiment, the disclosed MEPS uses a typical motor and/or a typical alternator with a magnetic coupling device, whereas in other embodiments the disclosed MEPS uses a novel magnetically enhanced motor and/or a magnetically enhanced alternator. For this disclosure, a "magnetic motor," a "magnetic coupler," and a "magnetic alternator" (or "magnetic generator") have special meanings.

In one embodiment, a "magnetic motor" as described herein is an electric motor that includes a stator and a rotor and a plurality of permanent magnets coupled to the rotor. In operation, the magnetic field of the motor is increased because of the static magnetic field of the permanent magnets on the rotor and the induced magnetic field of the stator by application of a (small) induced current into one or more coils within the stator and surrounding the rotor. The overall magnetic field is an enhanced magnetic field that combines a magnetic field of the rotor (B1) and the induced magnetic field of the stator (B2), which overall increases the torque/power output from the motor as compared to a conventional motor. Similar to a conventional motor, together, the rotor and stator produce a rotary force output from the motor based on supplied electrical energy to the stator. In contrast to prior art motors, the disclosed magnetic motor comprises a plurality of permanent magnets coupled to the rotor.

In one embodiment, a "magnetic coupler" as described herein is a mechanical coupler between two devices that comprises a plurality of permanent magnets. In one embodiment, the magnetic coupling device couples the prime mover (motor) to the alternator/DC generator, while in other embodiments it may be considered as a secondary prime mover as it helps and/or increases the torque provided by the motor to the alternator/DC generator. The magnetic coupler comprises permanent magnets that may be positioned on either (i) a rotor (e.g., the magnets may be coupled to one or more rotatable shafts within the magnetic coupling device, thereby rotating with the rotatable shafts) or on (ii) a rotor (rotating magnets) and a stator (stationary magnets) within the magnetic housing. In addition, the magnetic coupler may partially or entirely surround the output shaft of a motor and/or the input shaft of the alternator. In a first operation, a magnetic field is created based on a (small) induced current into one or more coils surrounding the rotor with permanent magnets (creating magnetic field B1); the induced rotating magnetic field of the magnetic coupler increases the torque/power output from the magnetic coupler. In a second operation, a magnetic field is present based on the first plurality of permanent magnets within the rotor (B1 magnetic field) and the second plurality of permanent magnets (B2 magnetic field) within the housing/stator; based on the rotation of the inner magnets coupled to the shaft, which is coupled to the motor output shaft, the rotating inherent magnetic field of the magnetic coupler increases the torque/power output from the magnetic coupler. Thus, as compared to a conventional spider coupling, the described magnetic coupling increases the produced torque/power based on the inherent magnetic field of the permanent magnets.

In one embodiment, a "magnetic generator" (or "magnetic alternator") as described herein is an alternator or generator that includes a plurality of permanent magnets on both the rotor and the stator of the generator. In operation, the overall magnetic field of the generator/alternator is increased because of the static magnetic field of the permanent magnets on the outer shell of the stator. The overall magnetic field is an enhanced magnetic field that combines a magnetic field of the rotor (B1) and a magnetic field of the stator (B2), which overall increases the torque/power output from the motor as compared to a conventional generator (which may only have permanent magnets coupled to a rotor and not the stator). In effect, the generator is able to vary a magnetic field from static to kinetic to amplify the power output based on given mechanical movement. Similar to a conventional alternator, together, the rotor and stator convert a rotary force input into electrical energy. In contrast to prior art alternators/generators, the disclosed magnetic alternator comprises a plurality of magnets coupled to the stator and/or part of a housing that surrounds the rotor and/or rotating input shaft of the alternator.

Figure 2:
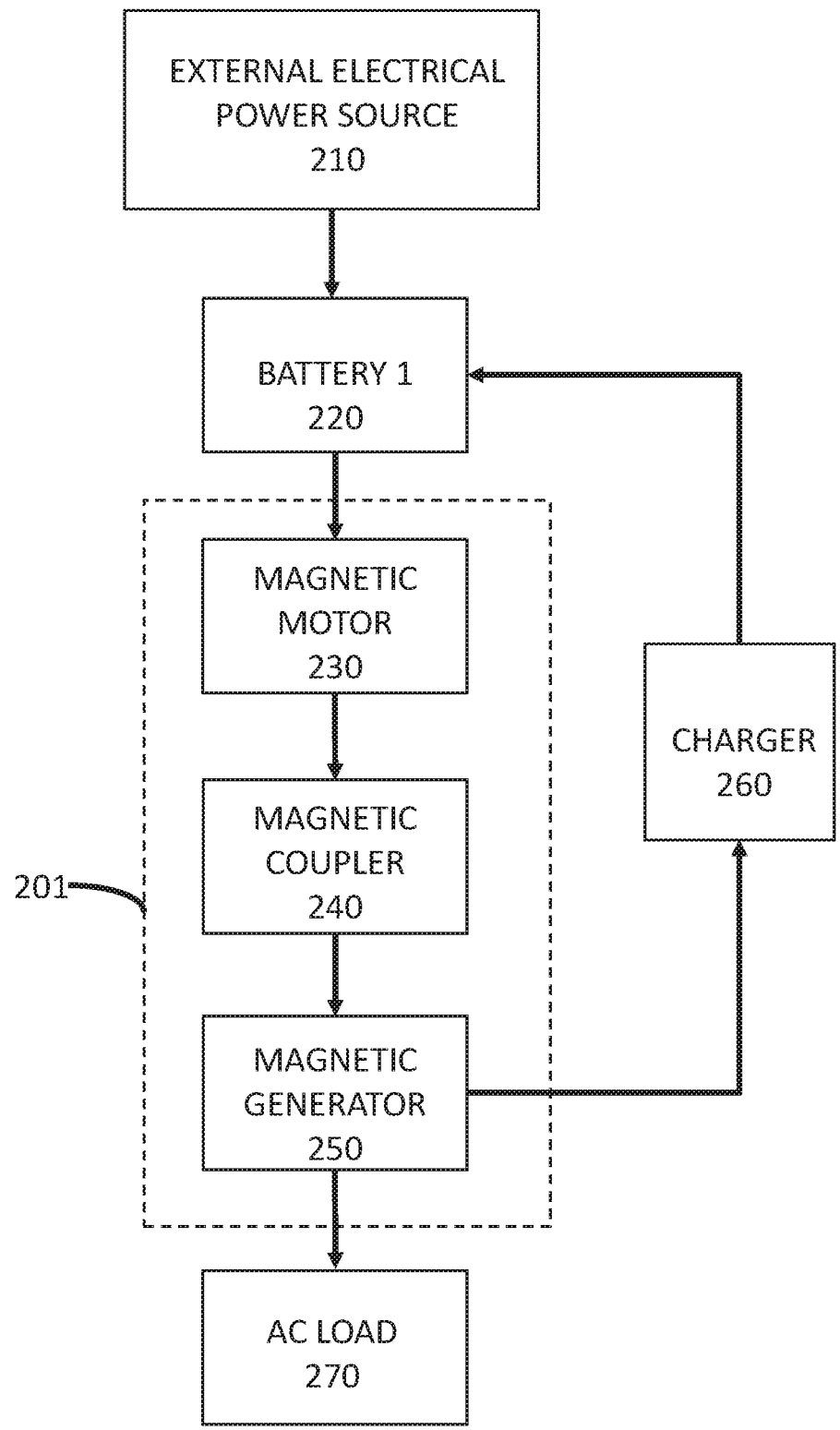
FIG. 2 illustrates an electrical flow diagram of another embodiment of an electrical power station of the present disclosure.

FIG. 2 illustrates an embodiment of an electrical flow diagram of a magnetic electrical power station ("MEPS") according to the present disclosure. FIG. 2 illustrates a system substantially similar to that described in FIG. 1 and similarly converts stored chemical energy (such as from a battery) into mechanical motive energy to cause rotation of an alternator or generator to produce electricity to one or more loads and to simultaneously recharge the battery system. In some embodiments, output power from a generator may not need to be re-routed from the generator to the supply batteries if the input power from the external power source is sufficient to offset any discharge of the batteries to provide the necessary power output of the system. In other words, if the loads are small enough, re-routing of the generator power to re-charge the battery systems may not be needed. One or more of the motor, coupler, or alternator/generator may be a magnetically enhanced device as described herein. In particular, the present disclosure focuses on a magnetic generator.

Referring to FIG. 2, a magnetic EPS ("MEPS") is illustrated that includes battery system 220 (i.e., source/supply batteries), motor 230, coupler 240, alternator/generator 250, and charger 260. The EPS may comprise and/or be coupled to external electrical power source 210 (such as a solar assembly array) and one or more external loads 270. This system may be AC based or may be DC based, and inverters or rectifiers would be needed as known in the art. The generator may be an AC based alternator (which would need an inverter if the load is DC based) or a DC based generator (which would need an inverter if the load is AC based). In one embodiment, the motor, coupler, and alternator of the system is considered a separate unit, as illustrated by the dashed boxed around the collective units. Together, the motor, coupler, and alternator/generator are considered as "genset" 201. The individual components illustrated in FIG. 2 may be substantially similar to those described in FIG. 1. The MEPS requires a control system (such as control system 180) as described herein.

For the MEPS unit, one or more of the MEPS components magnifies the power of the system; in other words, the power input to motor 230 from the source battery system 220 is magnified as an output from alternator/generator 250. In one embodiment, the described MEPS includes any one of the motor, coupler, or alternator as having a magnetically enhanced device. In other embodiments, two of the devices may comprise magnetically enhanced devices (such as motor and coupler, motor and alternator, or coupler and alternator). In still another embodiment, all three of the devices (motor, coupler, and alternator) may comprise a magnetically enhanced device. For illustration purposes, FIG. 2 shows that motor 230 is a magnetic motor, coupler 240 is a magnetic coupler, and generator 250 is a magnetic generator. In one embodiment, magnetic motor 230 comprises a plurality of permanent magnets coupled to a rotor of the motor. In one embodiment, magnetic generator 250 comprises a plurality of permanent magnets coupled to a stator of the generator, and may include a second plurality of permanent magnets coupled to a rotor of the generator. In one embodiment, magnetic coupler 240 comprises a first plurality of permanent magnets that are rotatable and a second plurality of permanent magnets that remain still. In one embodiment, the plurality of permanent magnets may comprise magnets of different strengths and arranged next to different strength magnets to facilitate movement/slippage of the shaft/rotor within the magnetic device.

In the embodiment of FIG. 2, the overall system has three enhanced magnetic devices. Assuming that each device produces either 2X electrical power output or requires ½ electrical power input, then the overall power amplification effects would be two, four, or eight times, based on whether one, two, or three separate magnetic devices are utilized. Thus, if a single magnetic device were utilized, the power amplification affects based on the use of magnetic devices (and corresponding permanent magnets) would be approximately 2 times. Likewise, if two magnetic devices were utilized, the overall enhancement would be approximately 4 times power output, and if three magnetic devices were utilized the overall power enhancement would be approximately 8 times. Of course, the actual power amplification factor depends on the particular configuration of magnets for each device and any inputted electrical power and variations thereof.

Permanently Magnetized Generator

In general, a generator is an electrical device that converts mechanical energy into electrical energy. The disclosed permanently magnetized generator produces electrical energy from mechanical energy with the aid of a plurality of permanent magnets arranged within the generator. In one embodiment, the disclosed generator has a rotating magnetic field and a static magnetic field. The disclosed generator may produce alternating current (AC) or direct current (DC).

In one embodiment, a "magnetic generator" (or "magnetic alternator") as described herein is an alternator or generator that includes a plurality of permanent magnets on both the rotor and the stator of the generator. In operation, the overall magnetic field of the generator/alternator is increased because of the static magnetic field of the permanent magnets on the outer shell of the stator. The overall magnetic field is an enhanced magnetic field that combines a magnetic field of the rotor (B1) and a magnetic field of the stator (B2), which overall increases the torque/power output from the motor as compared to a conventional generator (which may only have permanent magnets coupled to a rotor and not the stator). In effect, the generator is able to vary a magnetic field from static to kinetic to amplify the power output based on given mechanical movement.

The disclosed generator may be a standalone generator or used in combination with other components of an electric power station or genset unit, such as a coupler or a motor/prime mover. In other embodiments, the disclosed generator/alternator can be used as the generator in the electric power station disclosed in U.S. Pat. No. 9,768,632, incorporated herein by reference. The disclosed generator effectively produces a greater amount of electrical output based on the same amount of mechanical rotation. Thus, the disclosed generator is able to produce more power/torque based on the same energy.

Figure 3A:
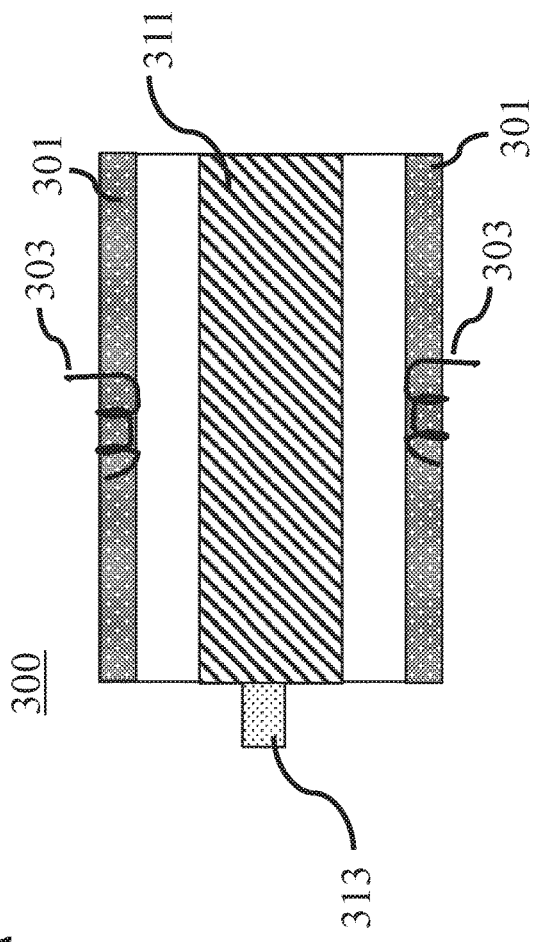
FIG. 3A illustrates a schematic of one embodiment of a conventional generator.

FIG. 3A illustrates a high-level schematic of one embodiment of a conventional generator. FIG. 3A shows a longitudinal cross section of the generator. Generator 300 may have an overall housing with rotor 311 located within stator 301. Rotor 311 may be substantially cylindrical and rotate within the housing and/or stator of the motor. An input shaft 313 may be coupled to a portion of the rotor. In one embodiment, the input shaft rotates in unison with the rotor. One or more electric coils 303 may be coupled to stator 301. As the input shaft rotates, the rotor rotates, thereby inducing a magnetic field into the stator and the coiled windings. Current is thus generated by the induced magnetic field within coils 303, based on the mechanical rotation of the rotor. As is known in the art, there may be three sets of stator windings that are offset from each other, such that the generator may produce three phase current. In one embodiment, a PMG generator may have permanent magnets coupled to the rotor that produce a magnetic field when rotated; these magnets are typically ferrous based magnets. In other embodiments, a generator may have an exciting coil instead of permanent magnets. A conventional generator does not use permanent magnets separate from a rotor, such as external to the generator and/or within the stator.

Figure 3B:
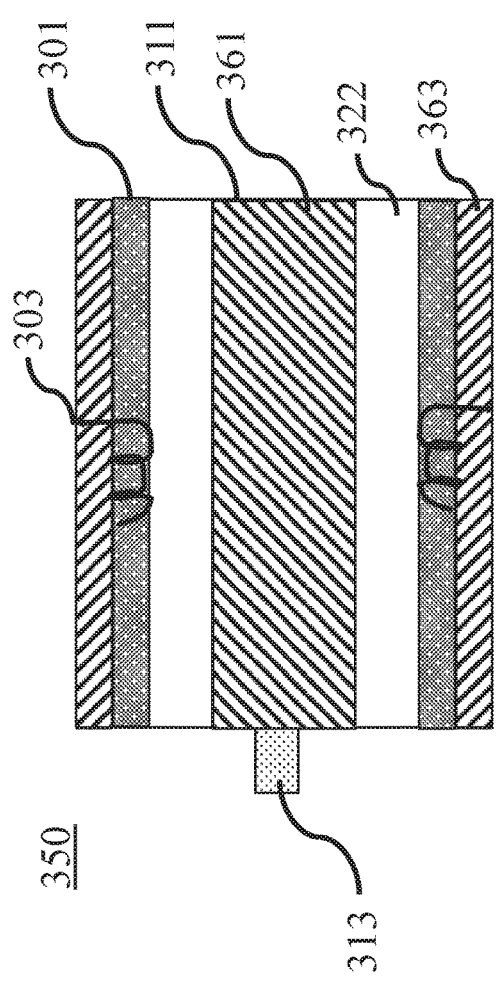
FIG. 3B illustrates a schematic of one embodiment of a generator according to the present disclosure.

FIG. 3B illustrates a schematic of one embodiment of a generator according to the present disclosure. FIG. 3B shows a longitudinal cross section of a permanently magnetized generator as disclosed herein. Generator 350 is substantially similar to generator 300 but includes permanent magnets both in the stator in addition to any magnets within the rotor. For example, generator 350 comprises rotor 311 coupled to input shaft 313. A first plurality of permanent magnets 361 is coupled to the rotor 311. Stator 301 comprises second plurality of magnets 363 located within the generator housing and/or stator 361. The stator surrounds some, all, or substantially all of the rotor. In one embodiment, the second plurality of magnets may be substantially external to coil 303. Based on the first and second plurality of permanent magnets, the disclosed generator provides static magnetic fields to the induced current produced by mechanical rotation of the rotor.

Figure 3C:
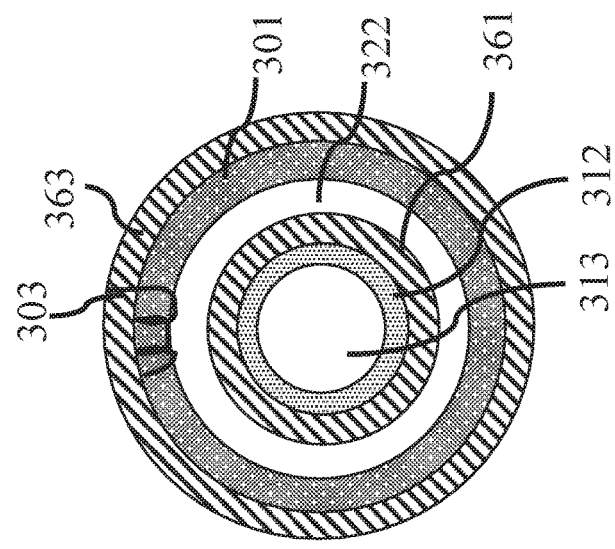
FIG. 3C illustrates a radial cross-sectional view of one embodiment of a generator according to the present disclosure.

FIG. 3C shows a radial cross-sectional view of the embodiment from FIG. 3B. Rotor 311 and/or shaft 313 is coupled to plurality of permanent magnets 361, which may be neodymium magnets. Magnets 361 may be arranged concentrically around rotor 311 (which may also be considered a shaft of the motor). Permanent magnets 361 may be located at a first radial position around the rotor, and in some embodiments may be separated by the rotor (or shaft 313 in FIG. 3C) by a first layer of insulation material 312. Magnets 361 may rotate with the rotor/shaft 313 as it rotates. The magnets may be coupled to the rotor/shaft in a variety of ways as is known in the art, and as more fully described below in relation to FIGS. 4F and 4G.

In one embodiment, a traditional stator housing 301 surrounds permanent magnets 361 coupled to the rotor. The stator may have one or more coils as is known in the art. For example, one or more electric coils or windings 303 may be located in the stator. The coil may be located within a concentric ring 301 (which may be a ferrous or other conductive material) or otherwise exterior to the first layer of magnets 361. An air gap 322 may separate the first plurality of permanent magnets 361 from the stator. In one embodiment, the air gap is between approximately 0.01 mm and 1 mm, and in one embodiment may be approximately 0.1 mm. The smaller the gap, the stronger the magnetic flux. In one embodiment, a second plurality of magnets 363 may be located in a stator of the generator, and may be located external to coil 303 and stator section 301. The second plurality of magnets may be located at a second radial position for the generator, and may be concentrically positioned around the rotor 361. In one embodiment, the second layer of permanent magnets increases the magnetic field such that any induced electrical current to coil 303 is increased by the enhanced magnetic field.

In one embodiment, each of the first plurality of magnets 361 has the same strength, while in other embodiments each of the first plurality of magnets 361 may have a plurality of different magnet strengths. Likewise, in one embodiment, each of the second plurality of magnets 363 has the same strength, while in other embodiments each of the second plurality of magnets 363 has a plurality of different magnet strengths. In one embodiment, the number of first plurality of magnets is different than the number of the second plurality of magnets. In one embodiment, the stator is made of a laminated metallic material and the rotor is not laminated. Instead, the rotor may comprise a substantially carbon steel body with a plurality of magnets coupled to the rotor. In other embodiments, both the stator and the rotor are laminated.

The magnets may be neodymium magnets, which are permanent magnets made from an alloy of neodymium (Nd), iron (Fe), and boron (B). In general, neodymium magnets are graded according to their maximum energy product, which relates to the magnetic flux output per unit volume. Higher values indicate stronger magnets, and may range from N35 up to N54 or greater. In one embodiment, the disclosed magnets are solid core neodymium magnets ranging from N38 to N52. Of course, other sizes, strengths, and types of permanent magnets may be utilized as would be known to one of skill in the art. In one embodiment, ferrous magnets of a conventional PMG generator may be removed and replaced with larger neodymium magnets; in other embodiments ferrous magnets of a conventional PMG generator may be left on the rotor and neodymium magnets inserted on the stator housing.

FIG. 4A illustrates an external magnetic housing coupled to a magnetic generator according to one embodiment of the present disclosure. Generator 400 comprises rotor 410 and stator 420, with a first plurality of permanent magnets 411 coupled to rotor 410 and a second plurality of permanent magnets 421 coupled to stator 420. The first plurality of magnets are arranged to rotate with rotor 410 and the second plurality of magnets are arranged to stay in a stationary/fixed position. Stator 420 may have one or more electric coils as is known in the art. Generator 400 may be substantially similar to the embodiments illustrated in FIGS. 3B and 3C. An electrical output is created by the induced current in the electric coils and is provided via induced current/voltage 403. A shaft 401 may be an input shaft to the generator, which is rotatable within the generator. Shaft 401 may be an output shaft of a motor or a coupler as described herein.

In one embodiment, external magnetic housing 440 is coupled to an input shaft of the generator. External magnetic housing 440 essentially provides an enhanced magnetic field to provide enhanced benefits to the rotating shaft 401 and thus the coupled generator 400. The use of the additional magnets increases the overall electrical output from the generator based on the same mechanical rotor rotation. In one embodiment, a conventional generator may be coupled to external magnetic housing 440, such as a conventional PMG generator. In other embodiments, a magnetic generator as disclosed herein (with multiple layers of permanent magnets, one layer in the rotor and one layer in the stator) may be coupled to the external magnetic housing 440 for increased power amplification effects. These additional magnetic components further enhance the output from the generator with no additional electrical input.

External magnetic housing 440 may comprise a first plurality of magnets coupled to the rotor and a second plurality of magnets external to the rotor. The first plurality of magnets may be coupled to a metallic ring 449 that is coupled directly to the rotor. The second plurality of magnets may be arranged radially and/or concentrically in various wafers/disks 441, 442 positioned around shaft 401. Each of the discs has a plurality of permanent magnets radially positioned within the disk; in some embodiments, multiple layers of magnets may be positioned at different radial positions within each disk/wafer. In one embodiment, metallic ring 449 is located between a pair of disks. For example, if there are two disks (D), each with a plurality of second magnets coupled to the disk, a metallic ring (R) with a first plurality of magnets may be positioned between each of the two disks, such as in a D:R:D arrangement. If there are three disks, then two rings may be necessary, such as in a D:R:D:R:D arrangement. The outer magnets in the disks acts as a stator magnetic housing (and a static magnetic field) and the inner magnets coupled to the rotor act as a rotor (a rotating magnetic field). The permanent outer magnetic field assists in the movement of the inner rotating field. The alignment of the magnets is such that the first and second plurality of magnets creates constant slippage/movement and prevents lockage. In one embodiment, the disks 441, 442 are positioned and/or attached to housing stand 448.

Figure 4C:
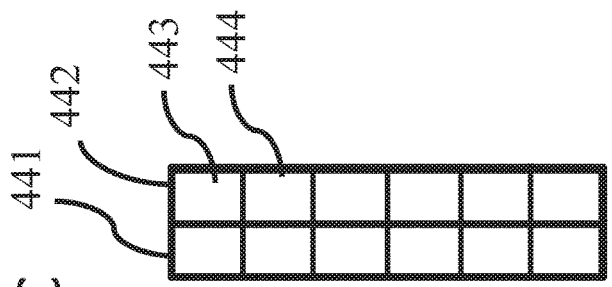
FIG. 4C illustrates a side schematic of one embodiment of an external magnetic housing for a generator according to the present disclosure.
Figure 4B:
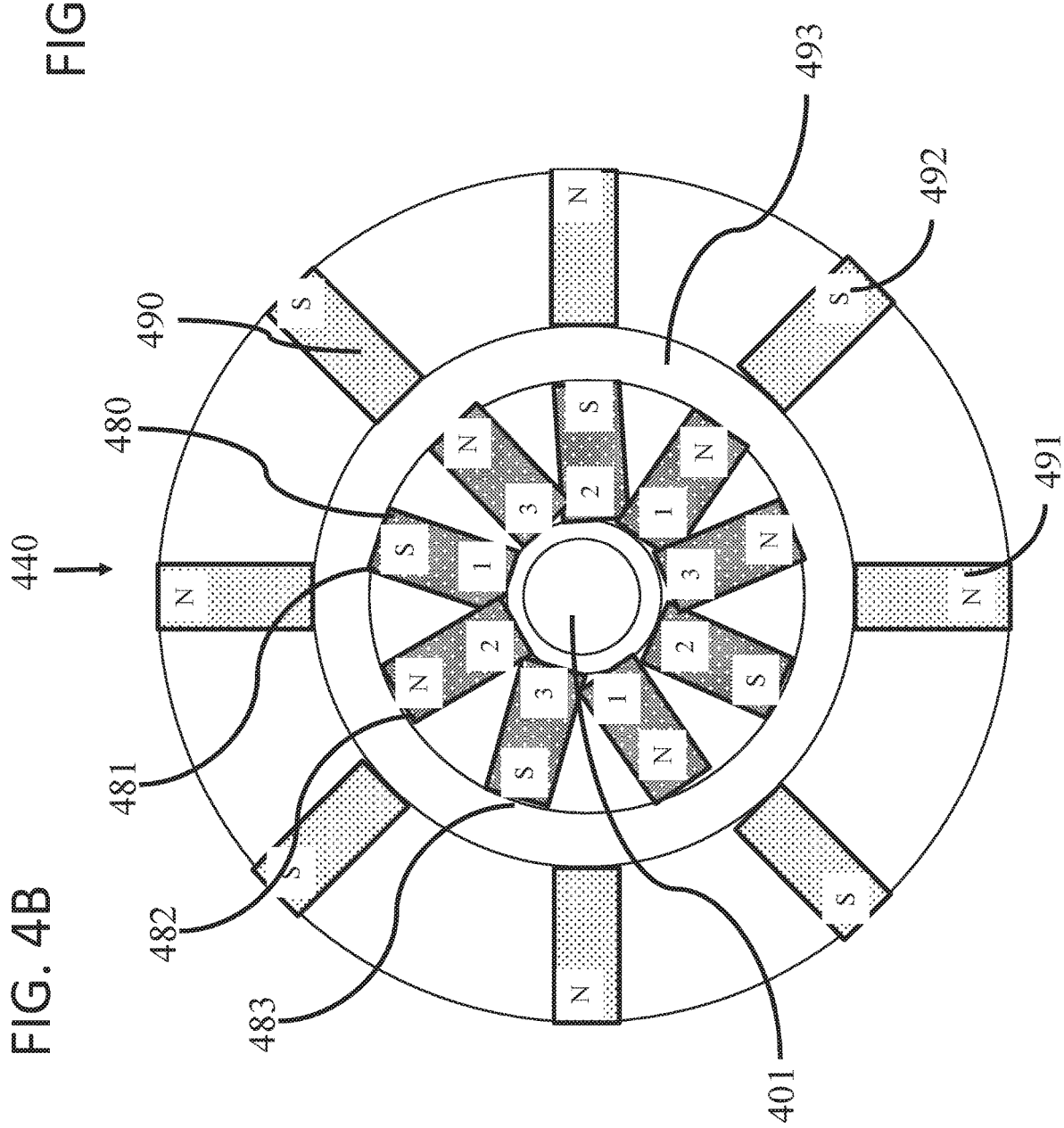
FIG. 4B illustrates a radial cross-section schematic of one embodiment of an external magnetic housing according to the present disclosure.

FIGS. 4B and 4C illustrate a cross-section and side schematic of external magnetic housing 440 from FIG. 4A, respectively. As illustrated in FIG. 4A, the external magnetic housing has a first plurality of magnets coupled to the rotor 401 and a second plurality of magnets in a stator/stationary portion of the magnetic housing. FIG. 4B illustrates a first plurality of magnets 480 coupled to shaft 401, and a second plurality of magnets 490 positioned radially outwards from the first plurality of magnets (such as in the wafers/disks 441, 442. The first plurality of magnets 480 rotate with the shaft (to create a rotating magnetic field) while the second plurality of magnets 490 remains substantially fixed. In one embodiment the first plurality of magnets may comprise at least magnets 481, 482, and 483, and the second plurality of magnets may comprise at least magnets 491, 492. The first plurality of magnets may be located at a first radial position (closer to the shaft) and the second plurality of magnets may be located at a second radial position further away from the shaft and separated by the first plurality of magnets by an air gap 493. As illustrated, each adjacent magnet is illustrated with a north or south pole, showing the attractive and/or opposing forces between the different magnets. While there are nine magnets illustrated in FIG. 4B, other arrangements and numbers is possible. In one embodiment, a greater number of magnets is desired to create a larger and more uniform magnetic field. Further, the number of magnets depends on the size and configuration of the magnets and the size of the shaft and magnetic coupling device/housing. For example, the smaller the number of magnets, the greater the space between each magnet. In one embodiment, the number of magnets coupled to the shaft is different than the number of magnets in the stator, which facilitates movement and prevents locking. For example, the inner layer of magnets may have nine magnets and the outer layer of magnets may have eight magnets. Of course, the sizing and spacing of the magnets is variable based on the sizes of the magnets and design of the housing itself.

While the illustration in FIG. 4B represents one cross-section of the external housing with coupled magnets, in practice the magnets may be extended an axial direction in a linear or diagonal pattern. Still further, rather than a single magnet having a certain axial length, a plurality of magnets may be axially positioned adjacent for the necessary axial length of magnets. Thus, while one embodiment of FIG. 4B shows nine inner magnets at a first radial position, it may have multiple axial groups of nine radial magnets, such that the number of magnets may be some multiple of the nine radial magnets.

In one embodiment, the permanent magnets may comprise a plurality of adjacent attractive and repulsive permanent magnets arranged in particular configurations (and sizes and strengths) to provide the desired magnetic field. For example, first magnet 481 is adjacent to second magnet 482, which is adjacent to third magnet 483. First magnet 481 may have a first strength (such as N42), second magnet 482 may have a second strength (such as N38), and third magnet 483 may have a third strength (such as N52). In one embodiment, each of the magnets may be a neodymium magnet between N38-N54, although other types of magnets and strengths are possible. This pattern repeats itself around the radius, with alternating magnet strengths of 1, 2, 3, 1, 2, 3, 1, 2, 3 (as illustrated in FIG. 4B). In one embodiment, the magnets are arranged in an order that is not numerically from the smallest to the largest strengths. For example, rather than having the magnets arranged from N38, N42, and N52, the magnets may be arranged as N42, N38, N52, which also helps rotation. As illustrated in FIG. 4B, the north and south pole of each magnet is arranged opposite to each other. In some embodiments, there may only be two different strengths of magnets while in other embodiments there may be four or more different strengths of magnets. Further, in another embodiment, all of the magnets have the same strength. The magnets may be arranged substantially diagonal around the rotor body and/or be substantially twisting around an exterior of the rotor. A similar pattern may be used in the outer magnets 491, 492. In one embodiment, each of the inner layer of magnets has different magnet strengths and the outer layer of magnets has the same magnet strength. In other embodiments, each of the outer layer of magnets has different magnet strengths and the inner layer of magnets have the same magnet strength.

While FIG. 4B illustrates one embodiment of the magnet arrangement for an external housing such as disclosed in FIG. 4A, the magnet arrangement illustrated in FIG. 4B may also be substantially similar to the arrangement of magnets illustrated in FIGS. 3B and 3C. As previously described herein, a magnetic generator may have a first plurality of permanent magnets coupled to the rotor and a second plurality of permanent magnets in a stator. Such an arrangement is schematically illustrated in FIG. 4B. For example, the first plurality of magnets 480 may be found on a rotor within a generator (such as magnets 361), and the second plurality of magnets 490 may be found in a stator within a generator (such as magnets 363).

As illustrated in FIG. 4C, the external magnetic housing 440 may comprise a plurality of adjacent wafers or disks 441, 442, each with a plurality of permanent magnets arranged in a concentric pattern. In one embodiment, each disk has a plurality of pockets 443, 444 spaced concentrically around the shaft in which each magnet may be positioned.

Figure 4E:
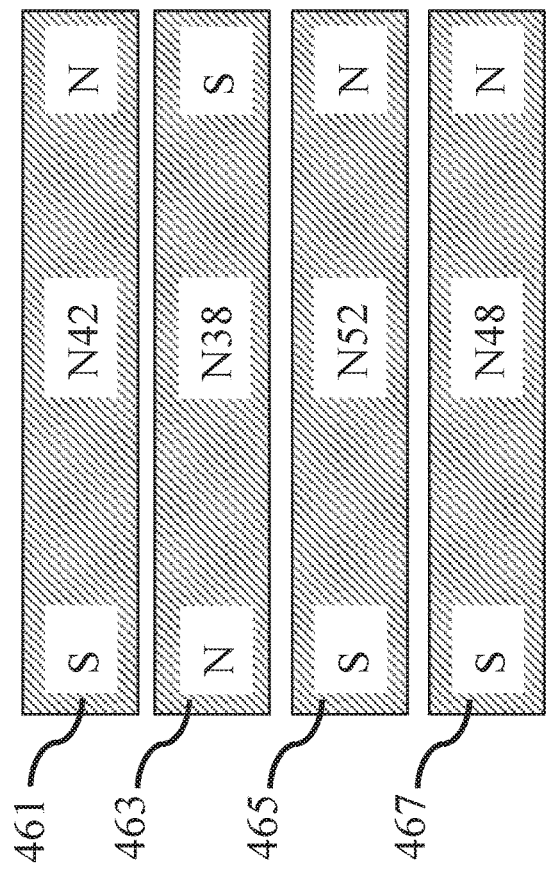
FIG. 4E illustrates a schematic view of one embodiment of an arrangement of magnets according to the present disclosure.
Figure 4G:
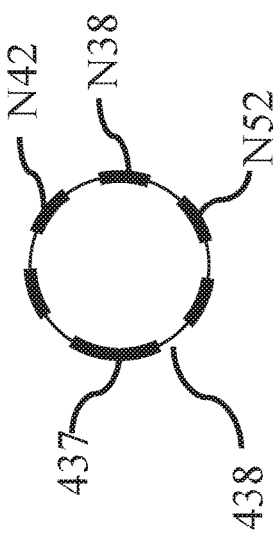
FIG. 4G illustrates a cross-sectional view of one embodiment of a cylindrical arrangement of magnets according to the present disclosure.
Figure 4D:
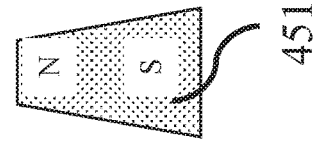
FIG. 4D illustrates a cross-sectional view of one embodiment of a permanent magnet according to the present disclosure.

FIG. 4D illustrates a cross-sectional view of one embodiment of a magnet used in the magnetic coupler of FIG. 4A. In one embodiment, magnet 451 is a neodymium magnet with a strength of N52. Magnet 451 may have a cross section in the shape of a parallelogram. Other shapes include triangles, circles, squares, and other quadrilaterals. In one embodiment, each of the magnets in the external housing is a longitudinal magnet. Thus, the overall shape of the external housing may be cylindrical with a plurality of magnets arranged adjacent to each other within each of the inner and outer levels of magnets. Still further, each magnet may be angled, such that the overall shape of the magnets is slightly twisted or wrapped. The arrangement and spacing of the magnets strongly influences the effect of the magnetic field (both static and applied) from the magnets. In one embodiment, a twisting arrangement of the magnets helps create a slightly unstable magnetic field between the magnets and causes constant relative motion between the magnets positioned on the rotor and the magnetic field from the motor stator. In one embodiment, the opposing end sides of the magnet have separate north and south poles. In another embodiment, the opposing faces of the magnet have the north and south poles. The present disclosure is not limited by the shape, thickness, configuration, or strength of the permanent magnet. While neodymium magnets may be one embodiment of the present disclosure, other higher strength magnets may similarly be utilized.

In general, the size, shape, strength, and arrangement of the magnets is variable based on the particular characteristics of the system and generator, and the intended strength, rpm, torque, etc., thereof. In one embodiment, the arrangement of the magnets within the external housing creates an induced (and unstable) magnetic field that creates constant movement of the rotor (with the coupled permanent magnets). In one embodiment, the individual size, strength, placement, and configuration of the magnets causes a magnetic flux between the north and south poles of the magnets thereby creating torque.

FIG. 4E illustrates a schematic view of one embodiment of a plurality of permanent magnets arranged adjacent to each other. As illustrated, each adjacent magnet is arranged in alternating north and south poles. Also, each magnet is separated by a certain distance. The arrangement of the magnets shows alternating magnet strengths of N42, N32, N52, and N48 for magnets 461, 463, 465, and 467, respectively. In one embodiment, this pattern is repeated for the given radial distribution. For example, the pattern may be 1, 2, 3, 4, 1, 2, 3, 4, etc. If a different number of strength magnets are used, the pattern may be 1, 2, 3, 1, 2, 3, etc., or 1, 2, 1, 2, 1, 2, etc. While the magnets illustrated in FIG. 4E are rectangular, one of skill in the art will realize that this is merely an illustration and many other shapes may be utilized.

Figure 4F:
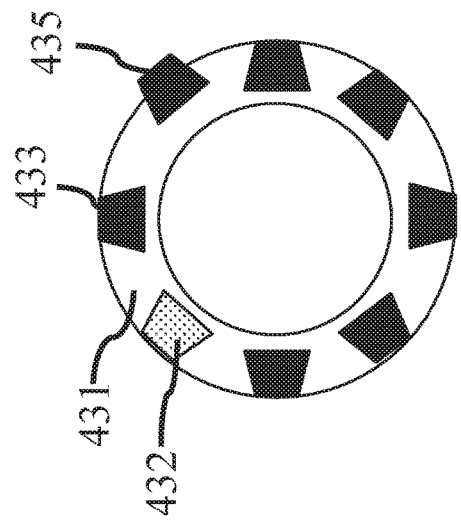
FIG. 4F illustrates a cross-sectional view of one embodiment of a cylindrical arrangement of magnets according to the present disclosure.

FIGS. 4F and 4G illustrate how magnets may be coupled to a ring or shaft. For example, as illustrated in FIG. 4F, the magnets may be included within a ring that is pressed or slid around the shaft. In one embodiment, the magnets may fit within a groove or other machined opening of a metallic ring. For example, ring 431 may be substantially cylindrical and sized with an inner surface to be coupled to a shaft. A plurality of permanent magnets 433, 435 may be positioned at different positions around the ring such that together they are concentrically positioned around the shaft at a substantially first radial position. In one embodiment, the magnet may be substantially flush to an exterior surface of the ring, such as illustrated by magnet 433, or in other embodiments may extend outside of the ring and otherwise protrude or are exposed, such as illustrated by magnet 435. A plurality of grooves 432 may be machined into the ring into which the magnets are inserted. In another embodiment, the magnets may simply be glued together or directly coupled to the shaft and surrounded by a relatively thin (and non-conductive) outer sheathing, such as plastic, as illustrated in FIG. 4G. For example, magnets 437 may be positioned around the ring and enclosed by outer sheathing 438, which helps keep the magnets coupled to the shaft and prevents them from flying loose during rotation of the shaft. Similar attachment methods can be performed in the stator housing for the generator. In one embodiment, the outer layer of magnets are simply coupled to the exterior alternator housing. In other embodiments, an exterior housing may be located exterior to the rotor and on the inside surface of the exterior housing magnets are glued and/or otherwise securely fastened.

Figure 5B:
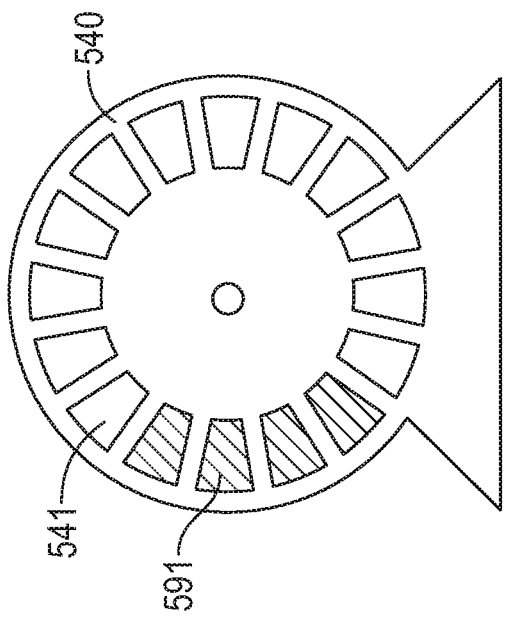
FIG. 5B illustrates a schematic of the magnetic housing from FIG. 5A with an outer set of magnets positioned in the inserts.
Figure 5D:
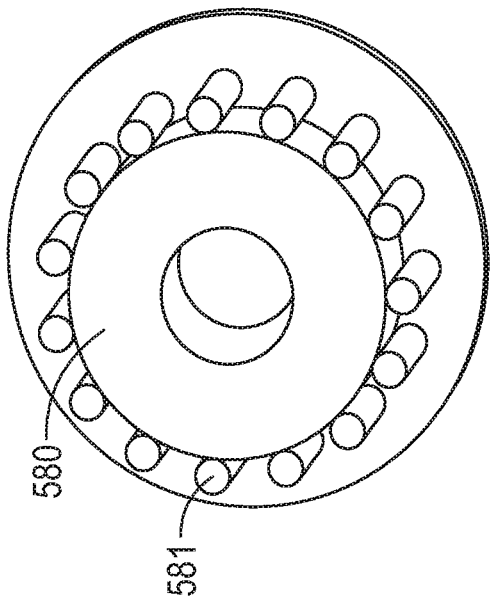
FIG. 5D illustrates a schematic of the inner ring from FIG. 5C.
Figure 5A:
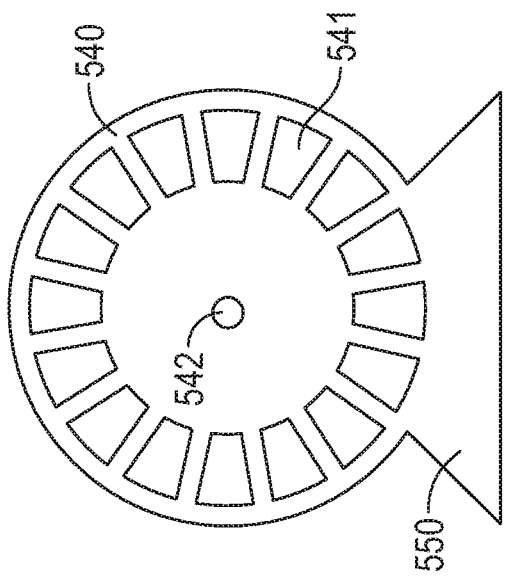
FIG. 5A illustrates a schematic of a magnetic housing wafer that can be used to surround an alternator or shaft, with radially arranged inserts for an outer set of magnets.

FIGS. 5A-5D illustrate various schematics of one embodiment of portions of an external magnetic housing according to one embodiment of the present disclosure. In one embodiment, the external housing illustrated in FIGS. 5A-5D may be substantially similar to the external housing 440 of FIG. 4A. The illustrated magnetic housing can be used to surround an alternator or shaft, which may be inserted through opening 542. FIG. 5A illustrates disk/wafer 540, which may be substantially similar to disks 441, 442 as illustrated in FIG. 4A. Disk/wafer 540 has a plurality of inserts 541 placed radially and/or concentrically around the wafer 540. Each insert may be sized to receive a magnet, and thus the configuration of the insert may correspond to that of the magnet to be positioned within the insert. In one embodiment, each disk/wafer 540 comprises two sheets of material, each approximately ¼ inch thick, and one of the sheets has inserts 541 located in the sheet, such that the insert itself is approximately ¼ inch deep, with the other insert being substantially solid such that any magnets positioned within insert 541 may be held in place by a solid backing. In one embodiment, wafer 540 may comprise support section 550.

FIG. 5B illustrates a schematic of the magnetic housing from FIG. 5A with a set of magnets 591 positioned in the inserts. In this embodiment, approximately sixteen (16) inserts 541 are located around the wafer 540, and thus sixteen magnets 591 may be arranged in inserts 541 around the shaft. For illustrative purposes, only four magnets 591 are illustrated in FIG. 5B. More or less may magnets may be utilized, which depends on the size of the magnets and the size of the housing. In one embodiment, magnets 591 comprise an outer set of magnets that remain stationary in relation to a rotor.

Figure 5C:
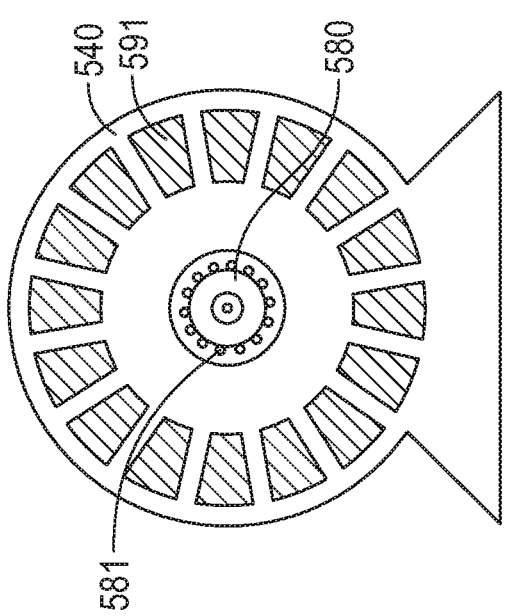
FIG. 5C illustrates a schematic of the magnetic housing from FIG. 5B with an inner ring coupled with an inner set of magnets.

FIG. 5C illustrates a schematic of the magnetic housing from FIG. 5B with inner ring 580 coupled with inner set of magnets 581. In one embodiment, magnets 581 comprise an inner set of magnets that rotate with the rotor. In one embodiment, inner ring is coupled to the rotor, such that rotation of the rotor rotates the ring and the attached magnets. Inner ring 580 may be substantially similar to ring 449 as illustrated in FIG. 4A. As illustrated, in one embodiment inner ring 580 may be positioned on one side of the wafer/disk 540, and thus may be sandwiched between two wafers/disks when they are placed adjacent to each other. FIG. 5D illustrates an exploded view of the inner ring from FIG. 5C. The ring 580 may be substantially metallic and a plurality of magnets 581 (such as fifteen) may be coupled to the ring. Magnets 581 may be cylindrical magnets, and in one embodiment a groove is machined into ring 580 to receive each of the magnets 581. In one embodiment, a portion of the magnet is exposed from the ring to increase the magnetic field.

In one embodiment, at least one of the disks/wafers 540 are arranged on either side of metallic ring 580. In one embodiment, the magnets utilized within the disks have north/south poles on the difference faces of the magnets, such that a same insert position on the wafer between the first and second wafers would have a north face of a first magnet opposing a south face of a second magnet. One of skill in the art will realize that other configurations of the external magnetic housing are possible, and that the first and second layer of magnets may be positioned around a shaft to the generator in multiple arrangements.

Figure 6A:
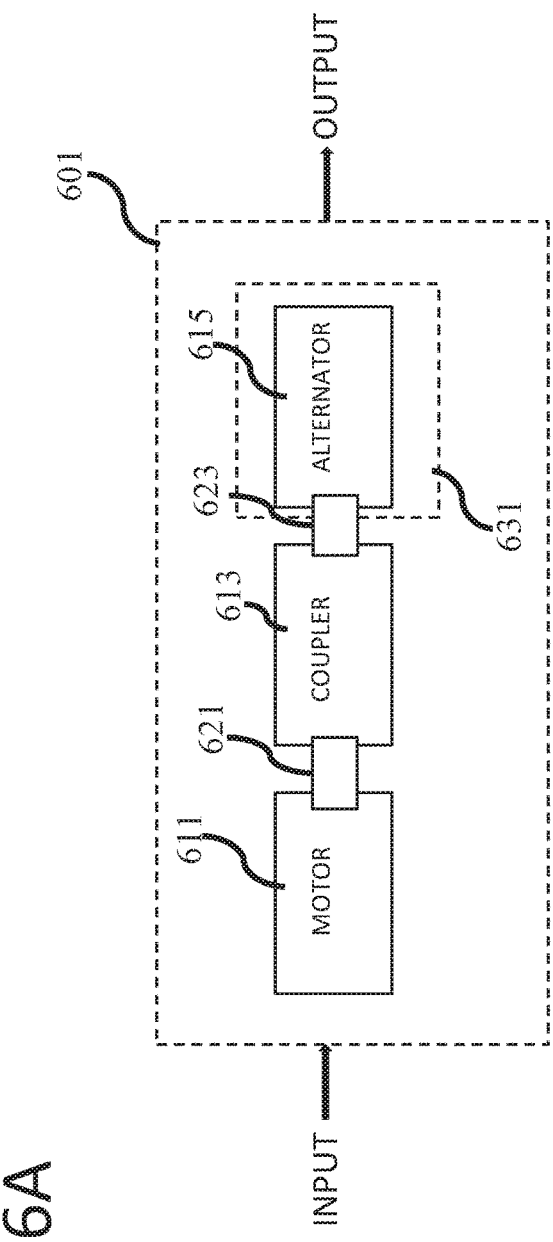
FIG. 6A illustrates one schematic of a genset with a motor, coupler, and alternator with an external magnetic housing positioned around the alternator/generator according to one embodiment of the present disclosure.
Figure 6B:
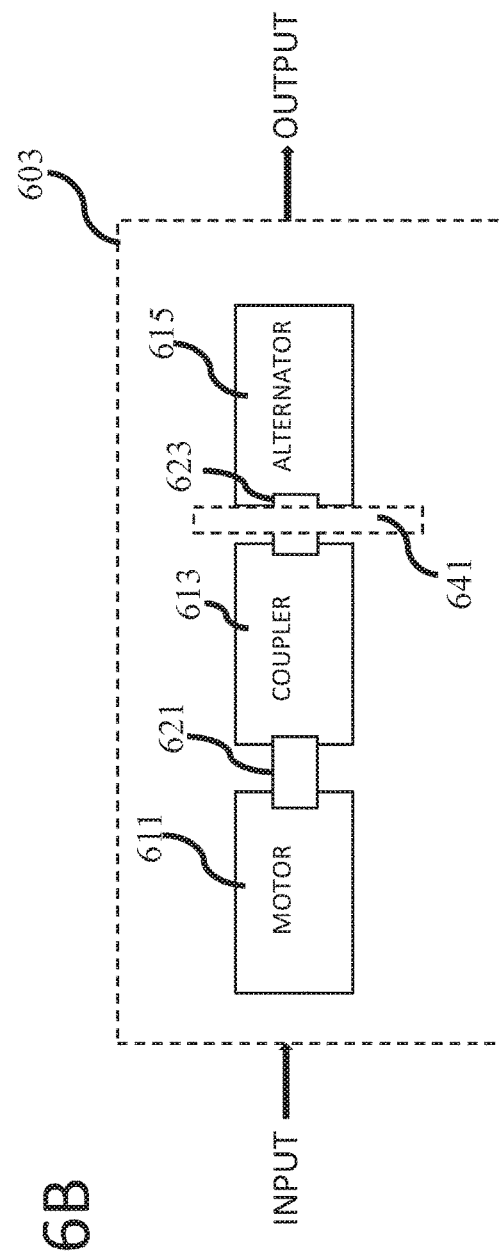
FIG. 6B illustrates one schematic of a genset with a motor, coupler, and alternator with an external magnetic housing positioned on an input shaft to the alternator/generator according to one embodiment of the present disclosure.

FIGS. 6A and 6B illustrate one schematic of a genset with a motor, coupler, and alternator with an external magnetic housing or field applied to one of the components. Similar to FIGS. 1 and 2, the disclosed generator/alternator can be used in a genset or an electric power station, such that motor 611 is coupled to alternator 615 via coupler 613. The coupler and motor may be traditional devices, or may include an enhanced magnetic field or a plurality of permanent magnets as described herein. In one embodiment, a flange or other fastening mechanism 621, 623 is located on each side of the coupler to secure it with the adjacent device. For example, first flange 621 couples the motor and second flange 623 couples the alternator, and in other embodiments, the mechanical couplers/flanges may be located within the coupler itself, and in still other embodiments a single direct coupling flange/device (such as a spider coupling) may couple an output shaft of the motor to an input shaft of the alternator/generator. Alternator 615 may be a traditional motor or may include a plurality of permanent magnets coupled to the stator, as described herein.

As described herein, electrical power is input to the motor, which produces mechanical output (rotation) of a shaft, which directly or indirectly produces mechanical input (rotation) of an input shaft to an alternator or DC generator, which then converts that mechanical energy into electrical energy. In one embodiment, based on the use of the permanent magnets within the generator or an external housing around or adjacent the generator, the input electricity to the genset system is less than the electrical output by the genset system. In one embodiment, the output power is at least two, three, or five times than input power. In one embodiment, a 5 hp motor may be used in conjunction with a similar sized alternator to produce 5 kVa, and with the disclosed magnetic housing, the overall system may be designed to produce 10 kVa based on the enhanced benefits of the magnetic housing. In effect, the use of permanent magnets provides an additional magnetic field B that is used to enhance the rotational output of the generator. The permanent magnets allows a higher power output for the same amount of electrical input, or vice versa, a lower amount of electrical input for the same amount of electrical output.

In one embodiment, FIG. 6A illustrates an external magnetic housing positioned around the generator/alternator according to one embodiment. Magnetic housing 631 is coupled to a portion of generator 615, which enhances the power produced from the generator based on increased rotational power to the rotor. The magnetic housing may include a first plurality of permanent magnets (such as neodymium magnets) at a first radial position, or a first and second plurality of permanent magnets at different radial positions. The magnets may have the same strength or may include different strengths. In one embodiment, a first layer of magnets may be positioned directly on the alternator housing. In one embodiment, the magnetic housing may comprise multiple sections (which may be circular wafers) with cutouts in which are positioned the permanent magnets that extend throughout the plurality of sections (such as that illustrated in FIG. 5A). In other embodiments, separate magnets may be positioned within each section or portion of the housing. In one embodiment, the permanent magnets are positioned precisely around the generator to provide an enhanced magnetic flux to the components within the generator. In one embodiment, the electrical output of genset 601 is greater than the electrical input of genset 601.

FIG. 6B illustrates an embodiment similar to FIG. 6A, but shows an external magnetic housing 641 around an external shaft entering into the generator instead of around the alternator housing. This embodiment may be substantially similar to the embodiment illustrated in FIG. 4A. In one embodiment, magnetic housing 641 is coupled to an input shaft of generator 615, which enhances the rotational output of the output shaft to the generator. In one embodiment, the magnetic housing may include a first plurality of permanent magnets (such as neodymium magnets) at a first radial position and a second plurality of permanent magnets at a different radial position, such as that illustrated in FIG. 4B. In one embodiment, the first plurality of magnets may be coupled to the input shaft, and the second plurality of magnets may be stationary and surround the first plurality of magnets. The magnets may have the same strength or may include different strengths. In one embodiment, the first plurality of magnets may be arranged similar to FIG. 4B with alternating strengths, while the second layer of permanent magnets may have the same strengths. In one embodiment, the first layer of magnets acts as a rotor and the second layer of magnets acts as a stator. In one embodiment, the magnetic housing may comprise multiple sections (which may be circular wafers) with cutouts in which are positioned the permanent magnets that extend throughout the plurality of sections. In other embodiments, separate magnets may be positioned within each section or portion of the housing. In one embodiment, the electrical output of genset 603 is greater than the electrical input of genset 603.

Figure 7:
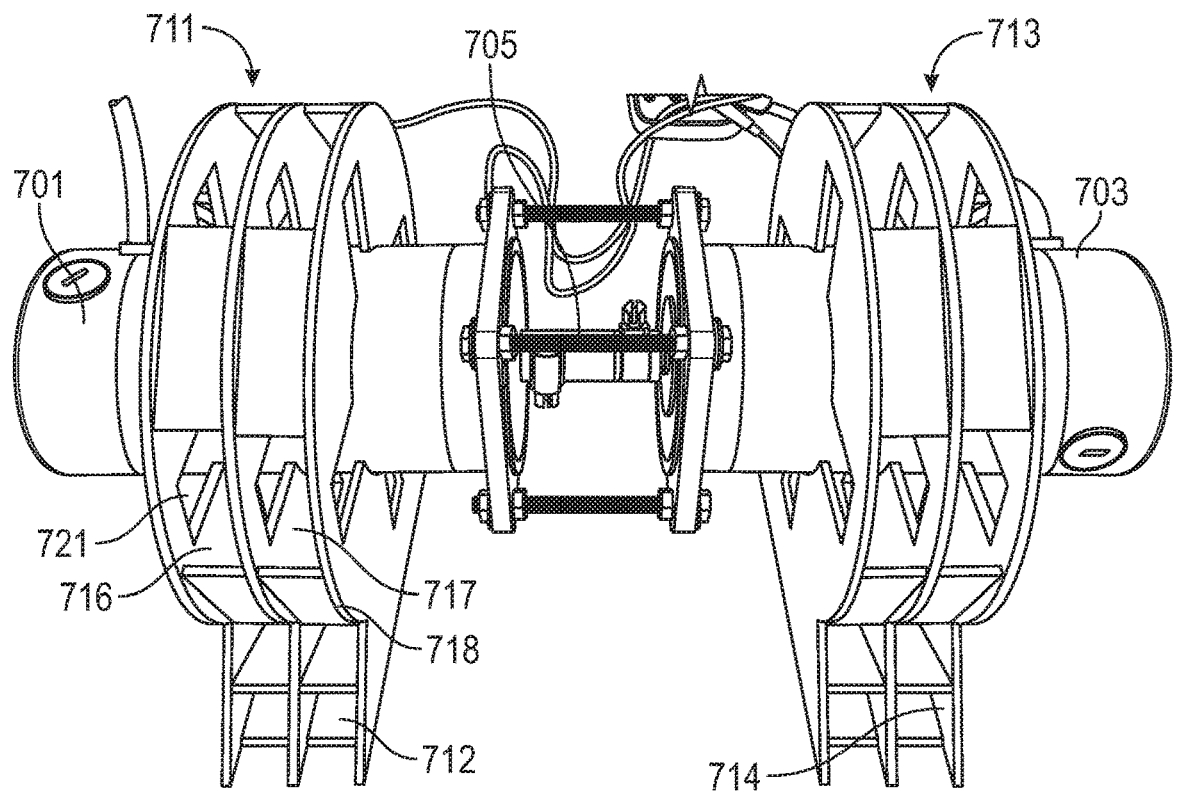
FIG. 7 is a schematic that illustrates external magnetic housings coupled to a motor and an alternator according to one embodiment of the present disclosure.

FIG. 7 is a schematic that illustrates magnetic housings coupled to a motor and an alternator according to one embodiment of the present disclosure, which may be substantially similar to the schematic embodiment illustrated in FIG. 6A. FIG. 7 illustrates motor 701 coupled to alternator 703 via a direct mechanical coupler 705. External housing 711 is positioned around motor 701 and external housing 713 is positioned around alternator 703. Each of the housings may have a base support 712, 714, respectively, to hold the housing in place. Each housing has a plurality of sections 716, 717, 718 in which magnets may be positioned radially or axially around the motor or alternator. While there are no magnets positioned within the external housings shown in FIG. 7, each housing has cutouts 721 in which permanent magnets may be placed. For example, each housing has three cylindrical wafers or sections 716, 717, 718 in which four rectangular cutouts 721 are spaced at opposing radial positions. In one embodiment, a magnet may be positioned within a cutout extending across all three wafers, as shown in FIG. 8.

Figure 8:
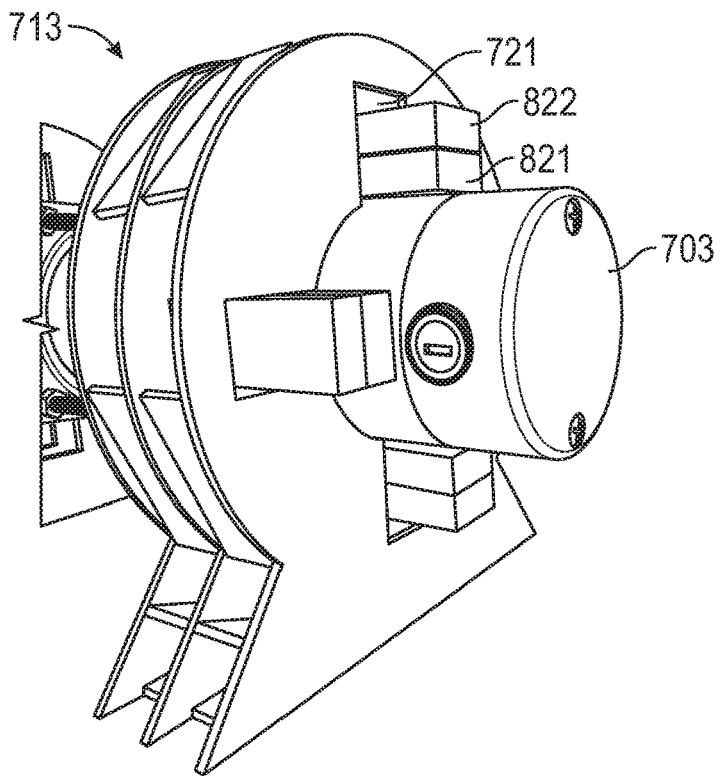
FIG. 8 is a schematic that illustrates a magnetic housing coupled to an alternator according to one embodiment of the present disclosure.

FIG. 8 is a schematic that illustrates a magnetic housing with magnets coupled to an alternator according to one embodiment of the present disclosure. In one embodiment, FIG. 8 shows magnets positioned within alternator housing 713 of FIG. 7. While the described housing is for an alternator, a similar housing may be positioned around the motor. FIG. 8 illustrates magnetic housing 713 that partially surrounds an alternator (or motor) 703. Within the housing is located a plurality of permanent magnets (such as neodymium magnets) that are spaced radially around alternator 703 at four different concentric positions within cutouts 721 (see FIG. 7). In one embodiment, a second layer of magnets is positioned at a further radial position then the first layer of magnets. For example, a first layer of magnets 821 may be positioned directly on the alternator housing 703 and a second layer of magnets 822 may be positioned directly on the first layer of magnets. In one embodiment, the magnetic housing 713 comprises three sections (which may be circular wafers) with cutouts in which are positioned the rectangular permanent magnets 821, 822 that extend throughout the plurality of sections. In other embodiments, separate magnets may be positioned within each section or portion of the housing. The permanent magnets are positioned precisely around alternator 703 (or motor) to provide an enhanced magnetic flux to the components within the alternator/motor and, consistent with the teachings in the present disclosure, enhance the electrical or mechanical output of the particular device based on the same amount of input energy.

Use/Operation

The versatility of the disclosed generator allows it to be utilized in a wide variety of operations. For example, it can be used in industrial, commercial, and/or residential applications. It may be used to apply a continuous load as a standalone power station or may be used in electrical stations or systems to provide standby or enhanced power management capabilities, such as an EPS unit as described in the '632 Patent. In general, the generator amplifies the mechanical output provided to increase the electrical output. Rotating an input shaft to a magnetic generator as described herein creates a rotating magnetic field (rotor with permanent magnets) and a static magnetic field (permanent magnets coupled to the stator) to enhance the electrical output produced from the generator. The rotational rate of the shaft may be varied (based on changing the output to a prime mover, such as a motor) to change the produced power.

In one embodiment, a method is disclosed that includes providing and/or utilizing an electrical power station (EPS), as described herein. In one embodiment, the EPS may comprise a magnetic motor and alternator/generator coupled together by a coupling device. In one embodiment it may also include a battery system, a charging system, and a control system. In one embodiment, the EPS may be coupled to one or more electrical power input systems, such as a solar assembly, and may service one or more external loads. The EPS may be AC or DC or AC/DC based.

In one embodiment, disclosed is a method of operating a generator, comprising providing a generator with a rotor and a stator and a plurality of permanent magnets coupled to the stator, increasing a static magnetic field of the generator by the plurality of permanent magnets, and rotating the rotor by a prime mover coupled to the generator to produce electrical output from the generator. The method may further comprise coupling a magnetic housing external to the generator to increase a magnetic flux of the generator. The method may further comprise rotating a second plurality of permanent magnets coupled to the rotor to increase the magnetic flux of the generator.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the configurations of the generator, magnets, and electric power station are within the scope of the invention. For example, the disclosed magnets may have the same strength or have varying strengths. An external magnetic housing may surround a conventional generator or may be coupled to an input shaft of the generator. The generator may be part of an electric power station or a stand-alone system that provides power to an external device. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A generator, comprising:
    a rotor;
    a stator;
    a first plurality of permanent magnets coupled to the rotor;
    a second plurality of permanent magnets coupled to the stator;
    an input shaft coupled to the rotor; and
    a magnetic housing surrounding at least a portion of the input shaft, wherein the magnetic housing comprises a third plurality of permanent magnets and a fourth plurality of permanent magnets, wherein the third plurality of permanent magnets is coupled to the input shaft and configured to rotate with the input shaft, wherein the fourth plurality of permanent magnets is configured to remain substantially stationary.

2. The generator of claim 1, wherein the generator is an alternator.

3. The generator of claim 1, wherein the generator is a DC generator.

4. The generator of claim 1, wherein the first plurality of permanent magnets is configured to rotate with the rotor and the second plurality of permanent magnets is configured to remain stationary.

5. The generator of claim 1, wherein the first plurality of permanent magnets is positioned at a first radial position and the second plurality of permanent magnets is positioned at a second radial position.

6. The generator of claim 1, wherein the first plurality of permanent magnets comprises a plurality of different magnet strengths.

7. The generator of claim 6, wherein each of the first plurality of magnets is positioned adjacent to a magnet of a different strength.

8. The generator of claim 6, wherein the second plurality of permanent magnets comprises a plurality of different magnet strengths.

9. The generator of claim 1, wherein the first plurality of permanent magnets and the second plurality of magnets comprises neodymium magnets.

10. The generator of claim 1, wherein the second plurality of permanent magnets is configured to increase the magnetic flux from the generator.

11. The generator of claim 1, wherein the second plurality of permanent magnets is configured to increase the mechanical rotation of the rotor.

12. The generator of claim 1, wherein the magnetic housing comprises a plurality of radial disks, wherein the third plurality of permanent magnets is located within the plurality of radial disks.

13. The generator of claim 1, wherein the magnetic housing comprises a ring positioned between the plurality of radial disks, wherein the fourth plurality of permanent magnets is coupled to the ring.

14. The generator of claim 1, wherein the third plurality of permanent magnets is located at a first radial position and the fourth plurality of permanent magnets is located at a second radial position.

15. The generator of claim 1, wherein the third and fourth plurality of permanent magnets is configured to increase the magnetic flux from the generator.

16. A permanent magnetized generator, comprising:
    a rotor and a stator;
    a magnetic housing external to the stator and configured to increase the magnetic flux of the generator;
    an input shaft coupled to the rotor; and
    a magnetic housing surrounding at least a portion of the input shaft, wherein the magnetic housing comprises a first plurality of permanent magnets at a first radial position and a second plurality of permanent magnets at a second radial position,
    wherein the first plurality of permanent magnets is coupled to the input shaft and configured to rotate with the input shaft, wherein the second plurality of permanent magnets is configured to remain substantially stationary.

17. The generator of claim 16, wherein the magnetic housing at least partially surrounds the stator.

18. A magnetic electrical power storage and production system, comprising:
    an electric motor;
    an electrical energy generator coupled to the electric motor,
    wherein the electrical energy generator comprises a rotor and a stator and a first plurality of permanent magnets coupled to the stator; and
    a magnetic housing surrounding at least a portion of the input shaft, wherein the magnetic housing comprises a third plurality of permanent magnets at a first radial position and a fourth plurality of permanent magnets at a second radial position,
    wherein the third plurality of permanent magnets is coupled to the input shaft and configured to rotate with the input shaft, wherein the fourth plurality of permanent magnets is configured to remain substantially stationary.

19. The system of claim 18, wherein the first plurality of permanent magnets remain stationary as the rotor rotates.

20. The system of claim 18, further comprising a second plurality of permanent magnets coupled to the rotor and configured to rotate with the rotor.

21. The system of claim 18, wherein an output power from the generator is greater than at least two times an input power to the motor.

* * * * *